(12) United States Patent
Lo

(10) Patent No.: US 9,086,574 B2
(45) Date of Patent: Jul. 21, 2015

(54) IDENTIFICATION TAG WITH HIDDEN MINIATURIZED IMAGES

(71) Applicant: 3DV Co. Ltd, Hong Kong (CN)

(72) Inventor: Kwok Wah Allen Lo, Hong Kong (CN)

(73) Assignee: 3DV Co., Ltd., Chai Wan, Hong Kong (CN)

( * ) Notice: Subject to any disclaimer, the term of this patent is extended or adjusted under 35 U.S.C. 154(b) by 90 days.

(21) Appl. No.: 13/887,470

(22) Filed: May 6, 2013

(65) Prior Publication Data

US 2013/0320090 A1 Dec. 5, 2013

Related U.S. Application Data

(60) Provisional application No. 61/653,491, filed on May 31, 2012, provisional application No. 61/781,292, filed on Mar. 14, 2013.

(51) Int. Cl.
*G02B 27/22* (2006.01)

(52) U.S. Cl.
CPC ..... *G02B 27/2214* (2013.01); *Y10T 428/24802* (2015.01)

(58) Field of Classification Search
CPC ............... G02B 27/2214; G09F 19/14; H04N 13/0404; A63H 33/38; A41D 27/085; Y10T 428/24802
See application file for complete search history.

(56) References Cited

U.S. PATENT DOCUMENTS

| | | | |
|---|---|---|---|
| 5,681,676 A * | 10/1997 | Telfer et al. | 430/22 |
| 7,806,343 B2 | 10/2010 | Wah Lo | |
| 2008/0123991 A1* | 5/2008 | Lo | 382/276 |

* cited by examiner

*Primary Examiner* — Sonji Johnson
(74) *Attorney, Agent, or Firm* — Ware, Fressola Maguire & Barber LLP

(57) ABSTRACT

A compressed print having one or more compressed images of a symbol is disclosed. The compressed images are formed on an image forming surface under a lenticular sheet. The lenticular sheet has a plurality of lenticules and each of the compressed images has a plurality of image elements formed under a lenticule. Each of the image elements is corresponding to a different portion of the symbol. The lenticules are designed to be so small that the compressed image formed under each of the lenticules is not discernible when a viewer looks at the compressed print at a normal viewing distance. As such, the miniaturized compressed images of the symbol can be used as an identification tag, hidden in the compressed print.

20 Claims, 20 Drawing Sheets

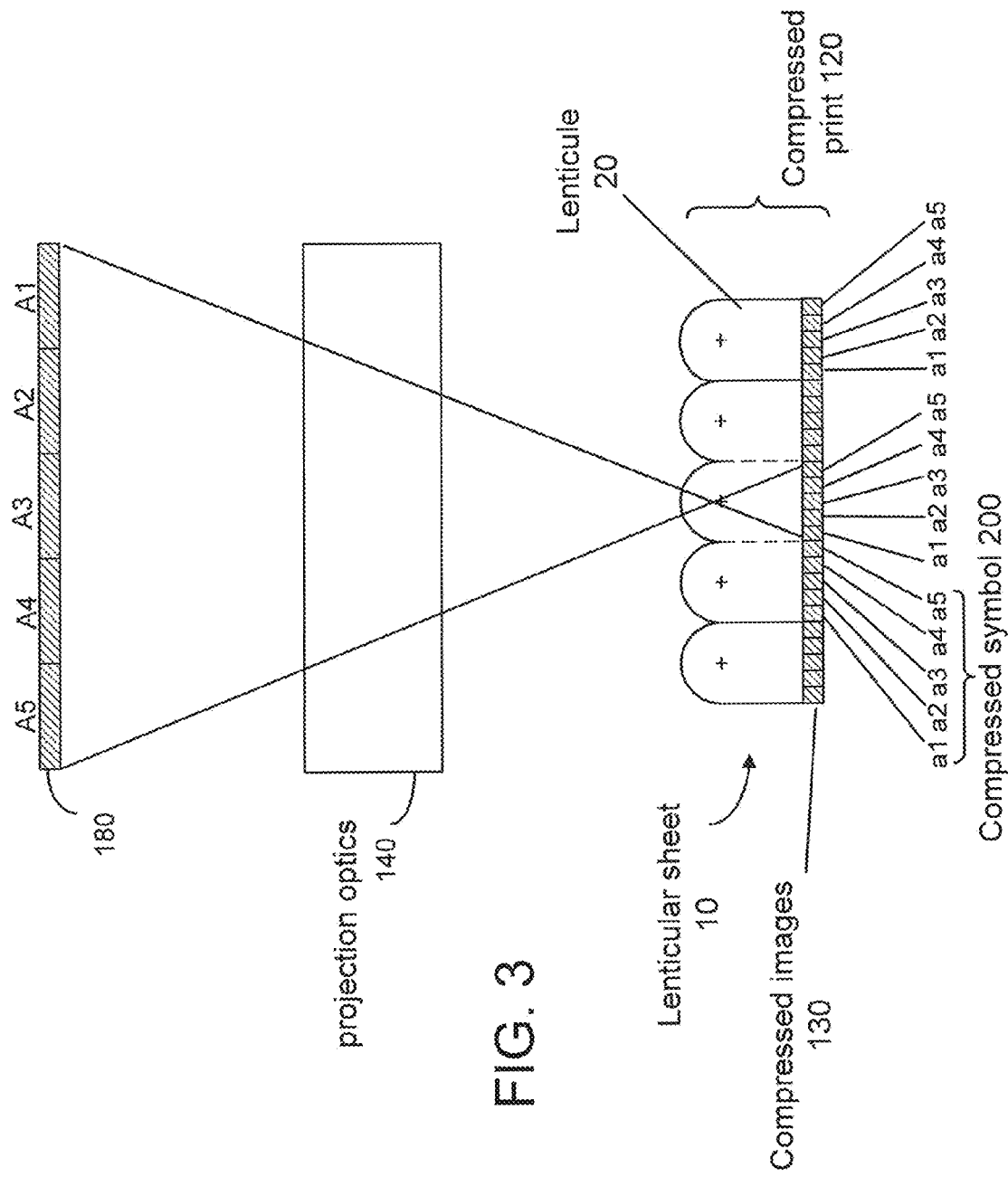

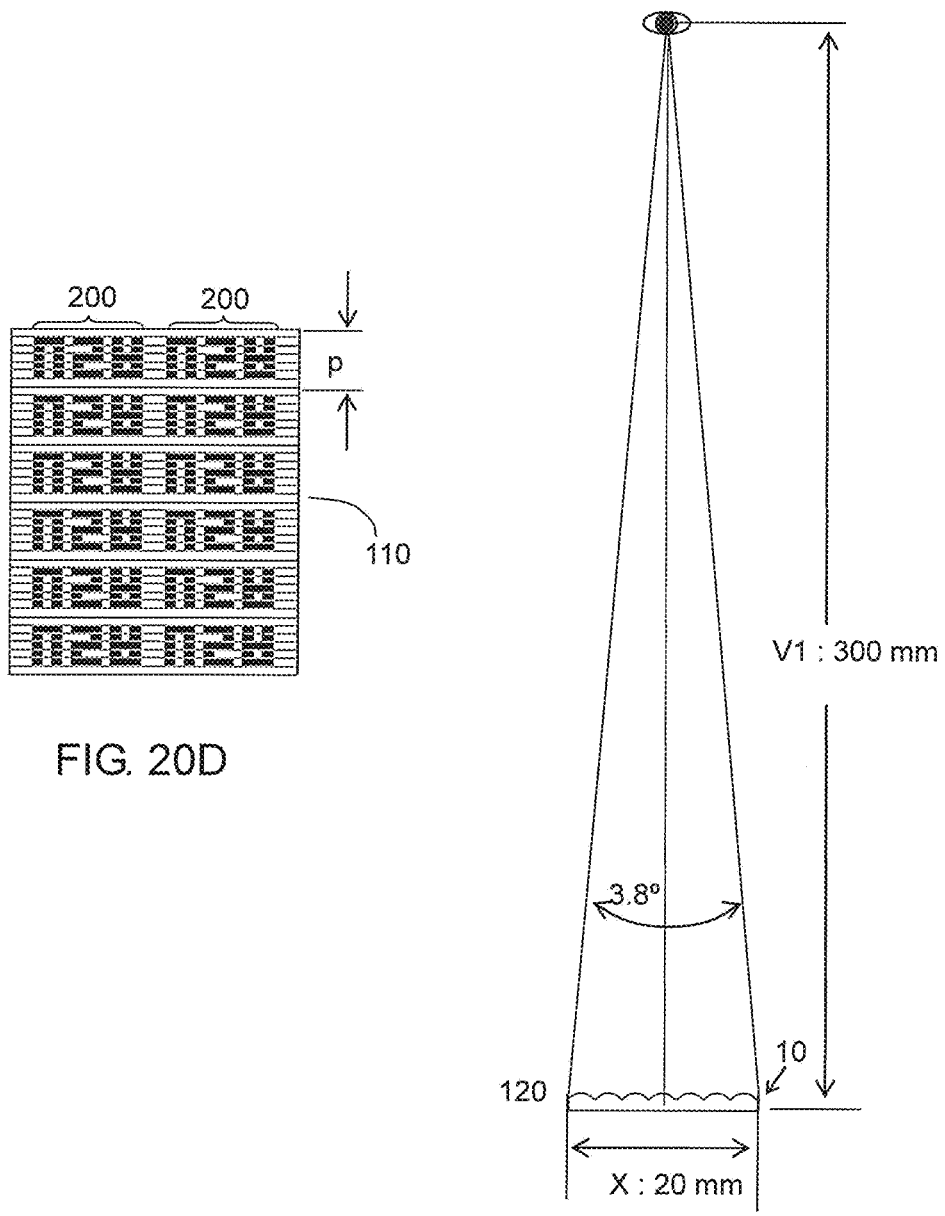

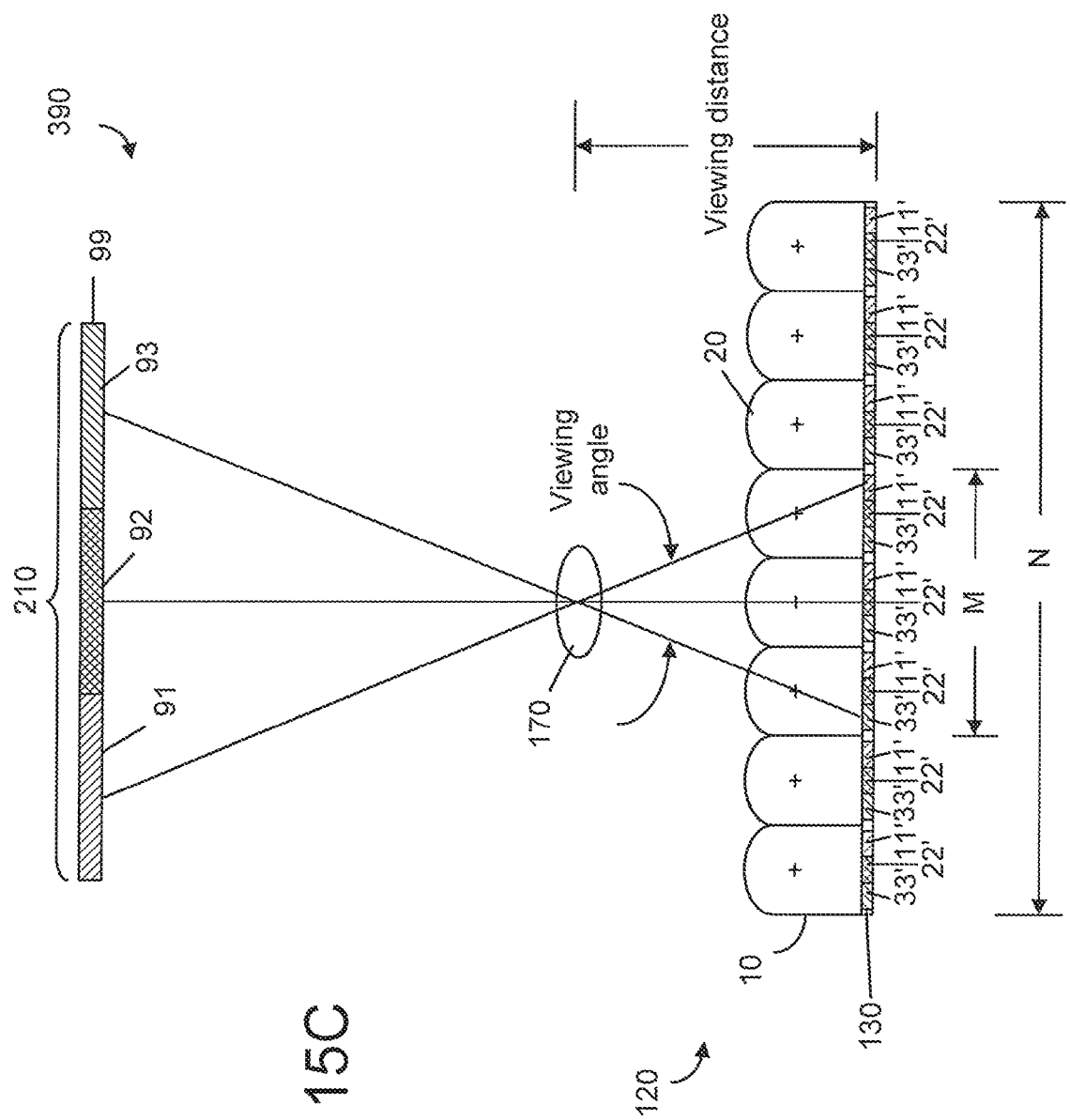

IDENTIFICATION TAG WITH HIDDEN MINIATURIZED IMAGES

CROSS REFERENCE TO RELATED APPLICATIONS

This application claims the benefits of U.S. Provisional Application No. 61/653,491, filed May 31, 2012 and U.S. Provisional Application No. 61/781,292, filed Mar. 14, 2013.

FIELD OF THE INVENTION

The present invention relates generally to a print having a lenticular sheet disposed on top of an image forming medium, such as photographic emulsion.

BACKGROUND OF THE INVENTION

A lenticular screen or sheet is commonly used to separate left and right images in a 3D picture or a 3D display. As shown in FIG. 1, a lenticular sheet 10 has a plurality of cylindrical lenses known as lenticules 20. At the base of each lenticule 20, at least two compressed images 30 are provided such that when a viewer views the 3D print, the left eye (LE) can see the left compressed images (LI) and the right eye (RE) can see the right compressed images (RI). If the compressed images (LI) and the compressed images (RI) are the images of the same scene taken at two different angles, the viewer would see a 3D image of the scene. It should be noted that, in some print with a lenticular sheet 10, the compressed images (LI) and the compressed images (RI) may be images that are not related to each other. For example, the printed images can be an image of an orange and an image of an apple. For that reason, the print 35 composed of the compressed images 30 is referred herein as a composite print.

In a 3D print or a composite print, each of the lenticules 20 is a parallax separator. Its main function is to limit the viewing angle within which a certain part of the compressed images can be seen at a certain angle. A lenticular sheet 10 is effectively a parallax barrier. FIG. 2A is a schematic presentation showing how the compressed images are produced. As shown in FIG. 2A, a left image 55L and a right image 55R are displayed, presented or projected at an object plane, one or more projection lenses 40 are used to projected the left image 55L and the right image 55R onto an image plane at different angles. When the projected images fall on the lenticular sheet 10, each of the lenticules 20, relying on the compression characteristics of a cylindrical lens, directs a portion of the projected left image to the left half of the lenticule base to form the compressed image LI and directs a portion of the projected right image to the right half of the lenticule base to form the compressed image RI. FIG. 2B is a schematic presentation showing the projection of a pair of images 50L, 50R with a width W through a lenticular sheet 10 having N lenticules 20 to produce a composite print 35. In general, the lenticular sheet 10 covering the composite print 35 has hundreds or thousands of lenticules 20, depending on the size of the composite print 35 and the pitch of the lenticular sheet 10. For simplicity, let us assume N=5, a non-realistically small number. As such, the composite print 35 is composed of five pairs of compressed image components (a1, b1), (a2, b2), (a3, b3), (a4, b4) and (a5, b5). Since an image having a width W is projected onto N lenticules, the compressed image component in each lenticule is corresponding to a portion (W/N) of the image. Thus, if we divide the image 55L into N (=5) parts: A1, A2, A3, A4 and A5, the compressed image a1 is corresponding to the image portion A1, the compressed image a2 is corresponding to the image portion A2, etc. Likewise, the compressed image b1 is corresponding to the image portion B1, etc.

In the above illustration, a composite print is composed of N pairs of compressed images, produced from two images 55L and 55R. A composite print can also be produced from three or more images as shown in FIG. 2C. In FIG. 2C, three images 55L, 55C, 55R are projected by projection lens onto a lenticular sheet 10 to make a composite image 35 such that each lenticule 20 has three compressed image components RI, CI and LI.

SUMMARY OF THE INVENTION

The present invention is concerned with a compressed print having one or more compressed images of a symbol formed on an image forming surface under a parallax barrier such as a lenticular sheet. Each of the image elements is corresponding to a different portion of the symbol. The lenticules on the lenticular sheet are designed to be so small that the compressed image formed under each of the lenticules is not discernible when a viewer looks at the compressed print at a normal viewing distance. As such, the miniaturized compressed images of the symbol can be used as an identification tag, hidden in the compressed print.

Thus, the first aspect of the present invention is a method for producing a compressed image of a symbol on a print, the print comprising an image forming surface and a parallax barrier disposed over the image forming surface, the parallax barrier comprising a plurality of barrier strips, wherein the image forming surface comprises a plurality of surface area strips, each surface area strip located substantially under a barrier strip. The method comprises dividing the symbol into a plurality of image portions; and forming a plurality of image elements in at least one of the surface area strips for producing the compressed image of the symbol in said at least one surface area strip, each image element corresponding to a different one of the image portions.

According to one embodiment of the present invention, each of the barrier strips has a longitudinal axis parallel to a first direction, and said dividing is carried out such that each image portion is adjacent to at least another one of the image portions in a second direction substantially perpendicular to the first direction.

According to one embodiment of the present invention, the method also comprises flipping the symbol about a flipping axis before dividing the symbol into a plurality of symbol image portions, and the flipping axis is substantially parallel to the first direction.

According to one embodiment of the present invention, the image elements are formed by optically projecting each of the image portions through the barrier strips at a different projection angle. The optical projecting comprises arranging the image portions on an object plane of a projection apparatus; locating each of the image portions at a different location along a second direction substantially perpendicular to the first direction so as to achieve the different projection angle; and locating the image forming surface on an image plane of the project apparatus, the projection apparatus configured to project the image portions through the barrier strips to form the corresponding image elements on the image forming surface.

According to one embodiment of the present invention, prior to optically projecting, each of image portions is broadened along to a direction substantially perpendicular to the first direction. When the compressed images are formed under a number of barrier strips, the image portions are broadened based on that number.

According to one embodiment of the present invention, the image elements are directly printed onto the image forming surface as a printed surface and a parallax barrier is attached to the printed surface to become a compressed print.

A second aspect of the present invention is a compressed print. The compressed print has an image forming surface; and a parallax barrier disposed over the image forming surface, the parallax barrier comprising a plurality of barrier strips, wherein the image forming surface comprises a plurality of surface area strips, each surface area strip located substantially under a barrier strip, wherein the image forming surface comprises at least one compressed image of a symbol, the symbol comprising a plurality of image portions, wherein the at least one compressed image comprises a plurality of image elements formed in one of the surface area strips, each image element corresponding to a different one of the image portions.

The compressed images can be photographically formed on the image forming surface by projecting the image portions through the parallax barrier. The compressed images can also be directly printed on the image forming surface and a parallax barrier is then attached to the image forming surface to become a compressed print.

A third aspect of the present invention is a method for viewing a symbol in a compressed print. The method comprises arranging a viewing apparatus over the compressed print at a viewing distance; and forming an image of the symbol, wherein the compressed print comprises an image forming surface; and a parallax barrier disposed over the image forming surface, the parallax barrier comprising a plurality of barrier strips, wherein the image forming surface comprises a plurality of surface area strips, each surface area strip located substantially under a barrier strip, wherein the image forming surface comprises at least one said symbol in each of N surface area strips, the symbol comprising M image elements, wherein N and M are positive integer greater than 2, and N is equal to or greater than M, wherein the viewing distance is arranged such that the image of the symbol comprises a plurality of image segments, each image segment indicative of a different one of said M image elements from a different one of the N surface area strips.

According to the present invention, the viewing apparatus comprises a camera having a display for forming the image of the symbol, or an image forming medium for forming the image of the symbol.

A fourth aspect of the present invention is a security identification system, which comprises a viewing apparatus configured to authenticate a security tag, the security tag comprising at least one compressed symbol formed under each of N consecutive barrier strips of a parallax barrier, each compressed symbol comprising M image elements, and wherein the viewing apparatus comprises viewing optics arranged at a view distance over the security tag for forming a reconstructed image indicative of the symbol, the viewing distance is arranged such that the reconstructed image comprises a plurality of image segments, each image segment comprising a different one of said M image elements from a different one of the N barrier strips, wherein N and M are positive integers greater than two and N is equal to or greater than M.

The present invention will become apparent upon reading the description and the drawings.

BRIEF DESCRIPTION OF THE DRAWINGS

FIG. 3 shows how a master image is projected onto a lenticular print material to make a compressed print, according to one embodiment of the present invention.

FIG. 14B shows the viewing angle of a viewer at a normal viewing distance.

FIG. 15C shows a viewing distance for setting up a viewing apparatus for viewing a complete compressed symbol.

FIG. 20D shows a printed substrate, according to an embodiment of the present invention.

DETAILED DESCRIPTION OF THE INVENTION

The present invention is concerned with providing miniaturized images under a parallax barrier. In particular, when an image can be compressed to fit within a pitch of the parallax barrier, the same image is printed in a plurality of adjacent pitches under a barrier strip. The pitch of the parallax barrier can be chosen such that the compressed image is indiscernible by naked eyes in order to hide the image from viewing. To see the hidden image, one must use a viewer with a viewing lens setup at a certain distance on top of the parallax barrier. The hidden miniaturized hidden images can be used as an identification tag.

Figure 1:
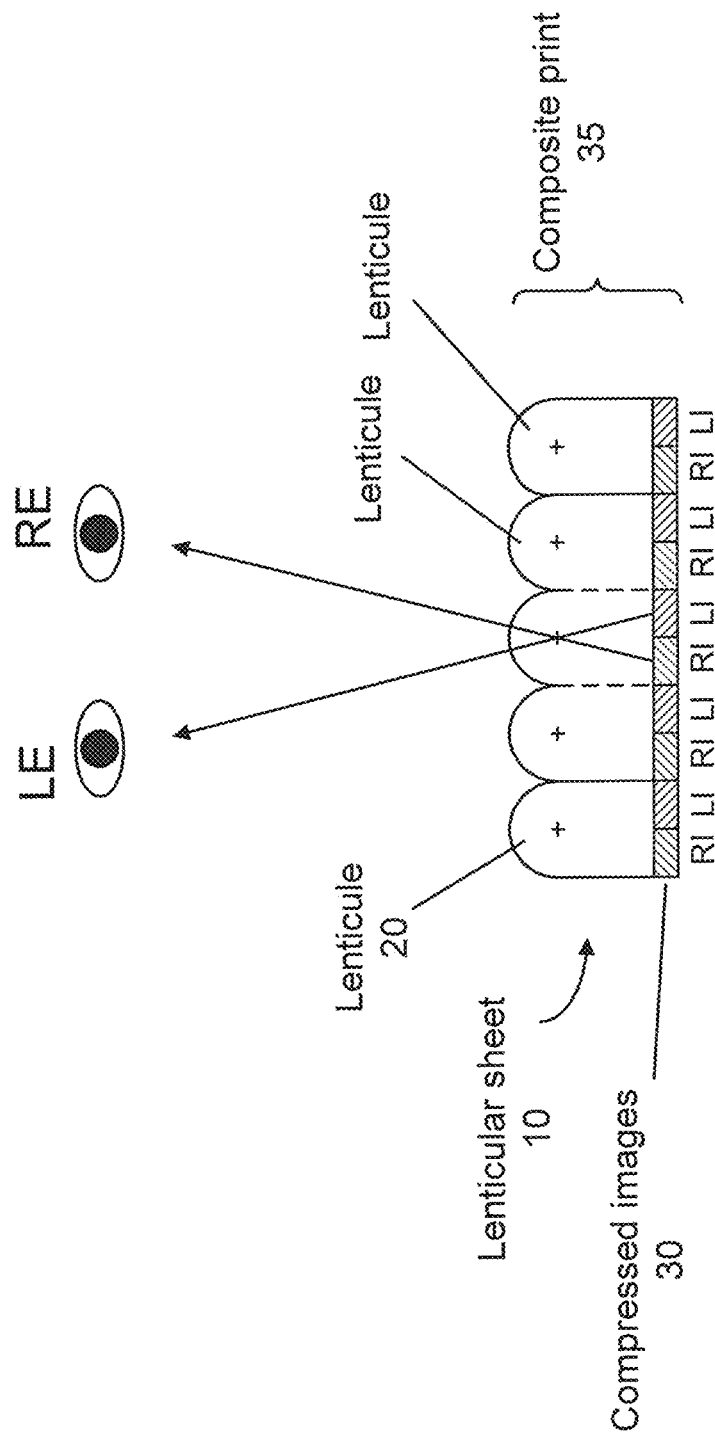
FIG. 1 shows a typical composite print made on a lenticular print material.
Figure 2A:
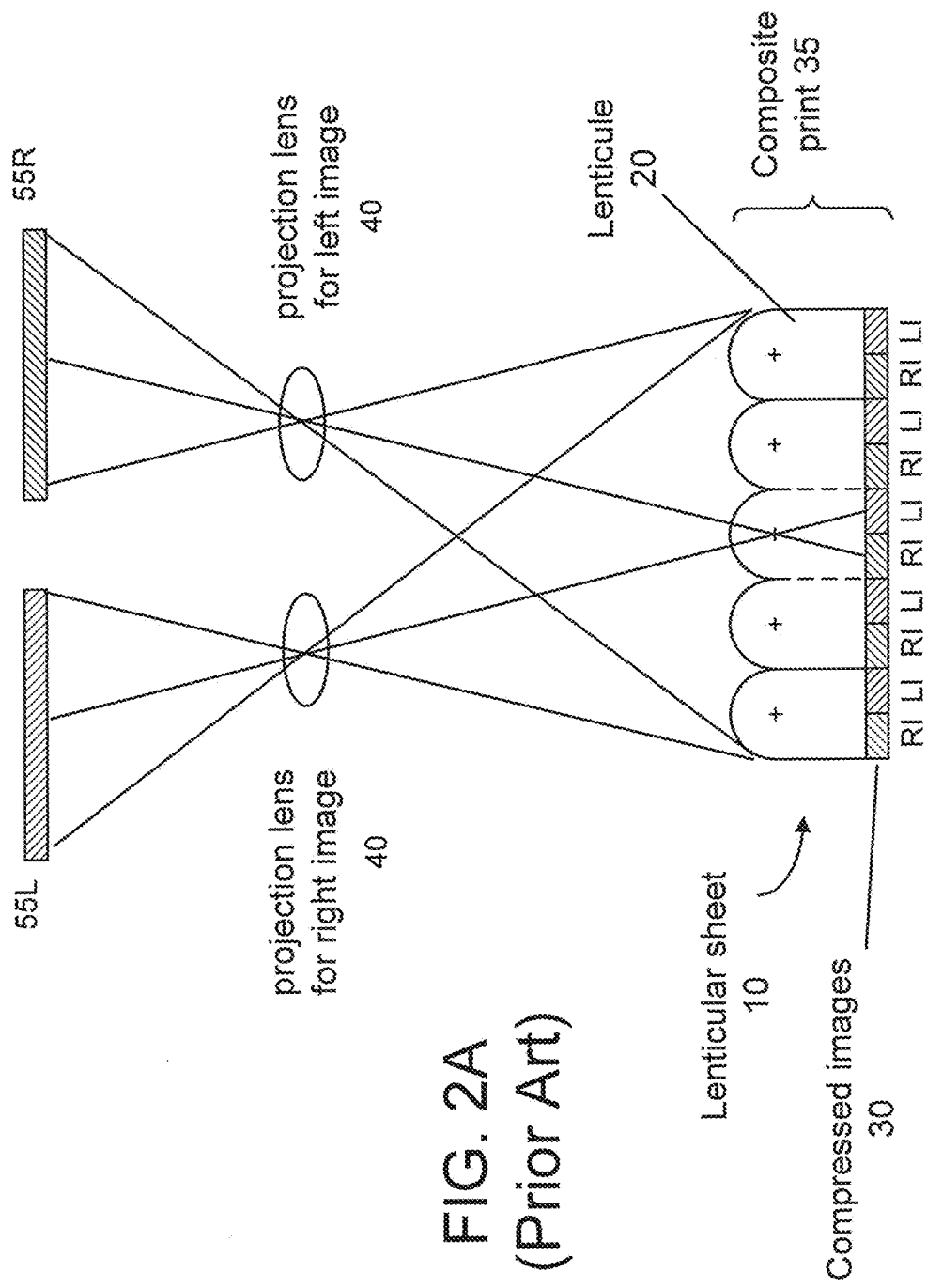
FIG. 2A shows the projection of two images to make a composite print.
Figure 2B:
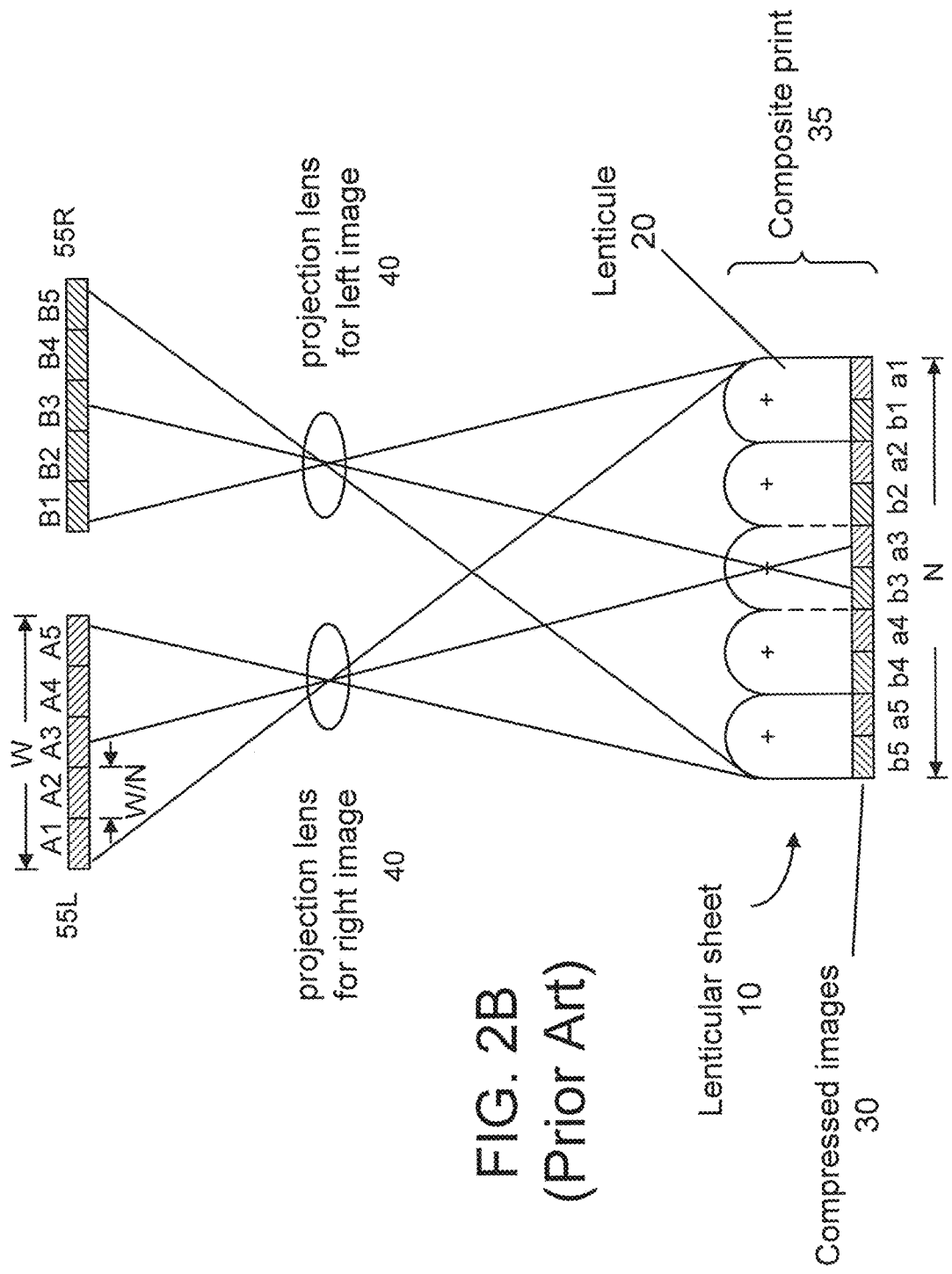
FIG. 2B shows the relationship between the images to be projected and the compressed image components on the composite print.
Figure 2C:
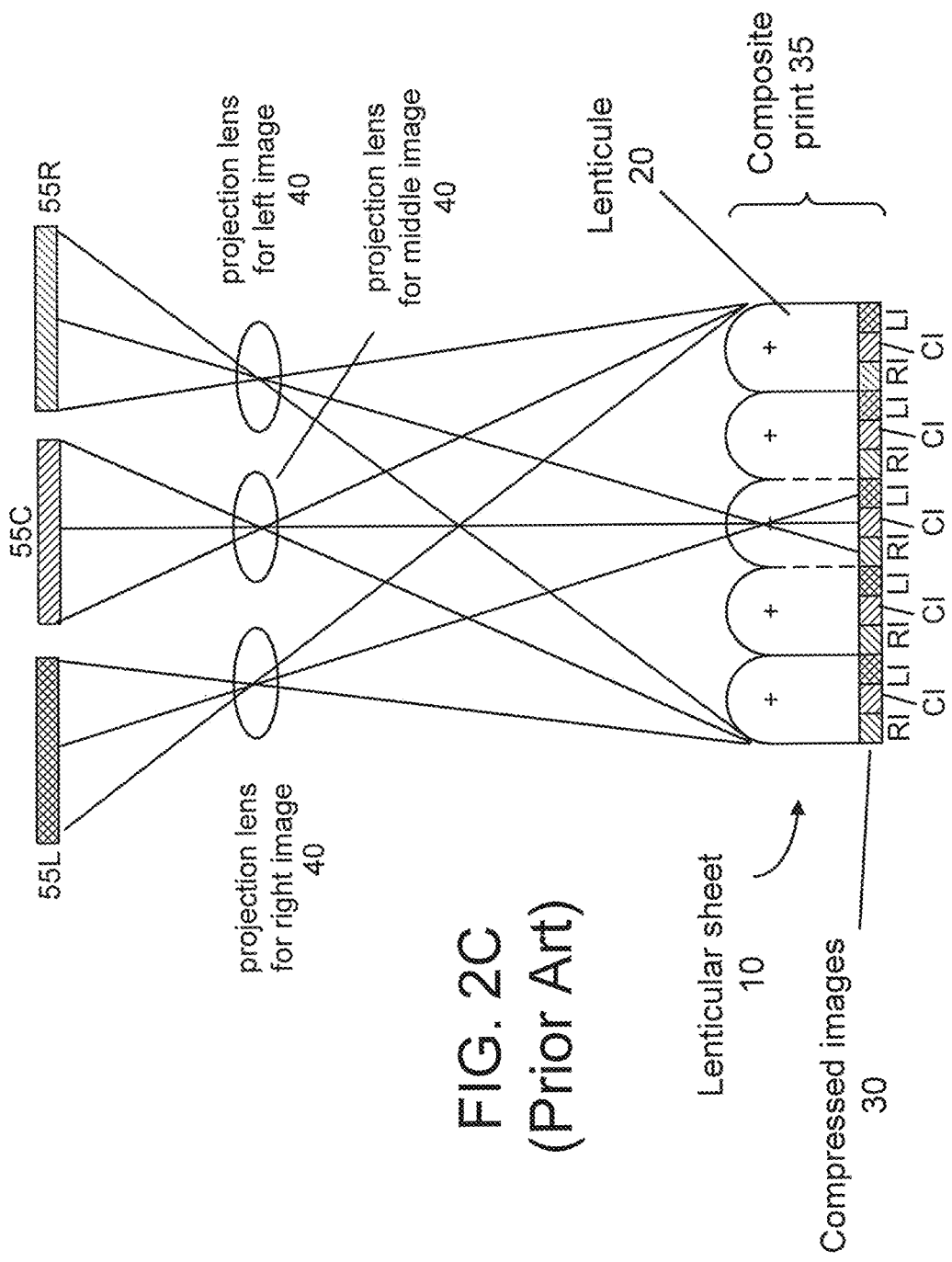
FIG. 2C shows the projection of three images to make a composite print.
Figure 5:
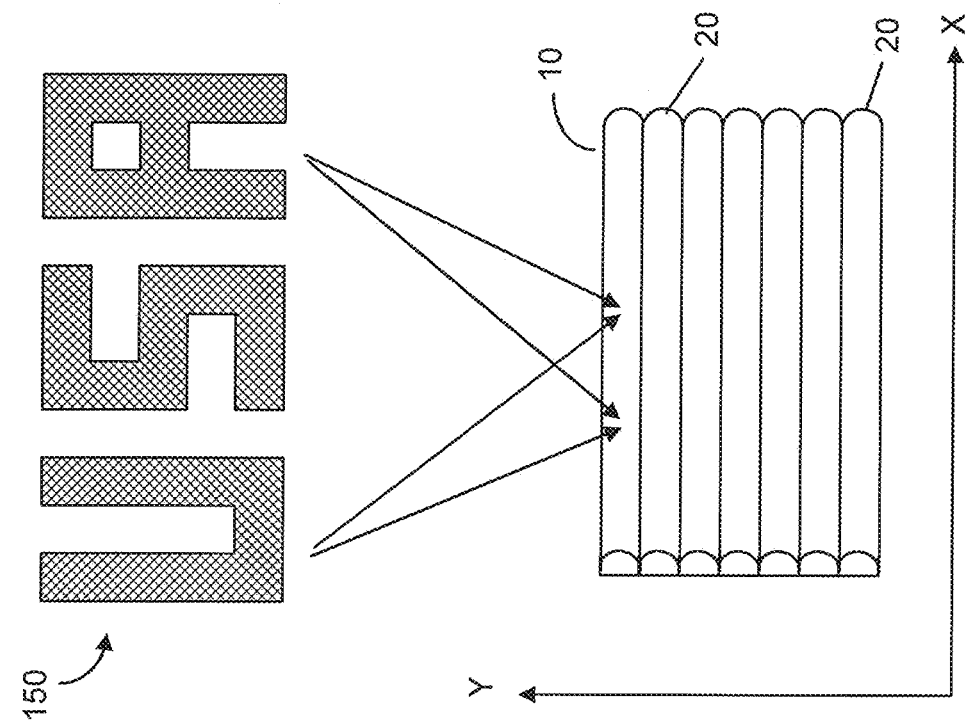
FIG. 5 shows a symbol to be printed in relationship with a lenticular print material, according to one embodiment of the present invention.
Figure 4:
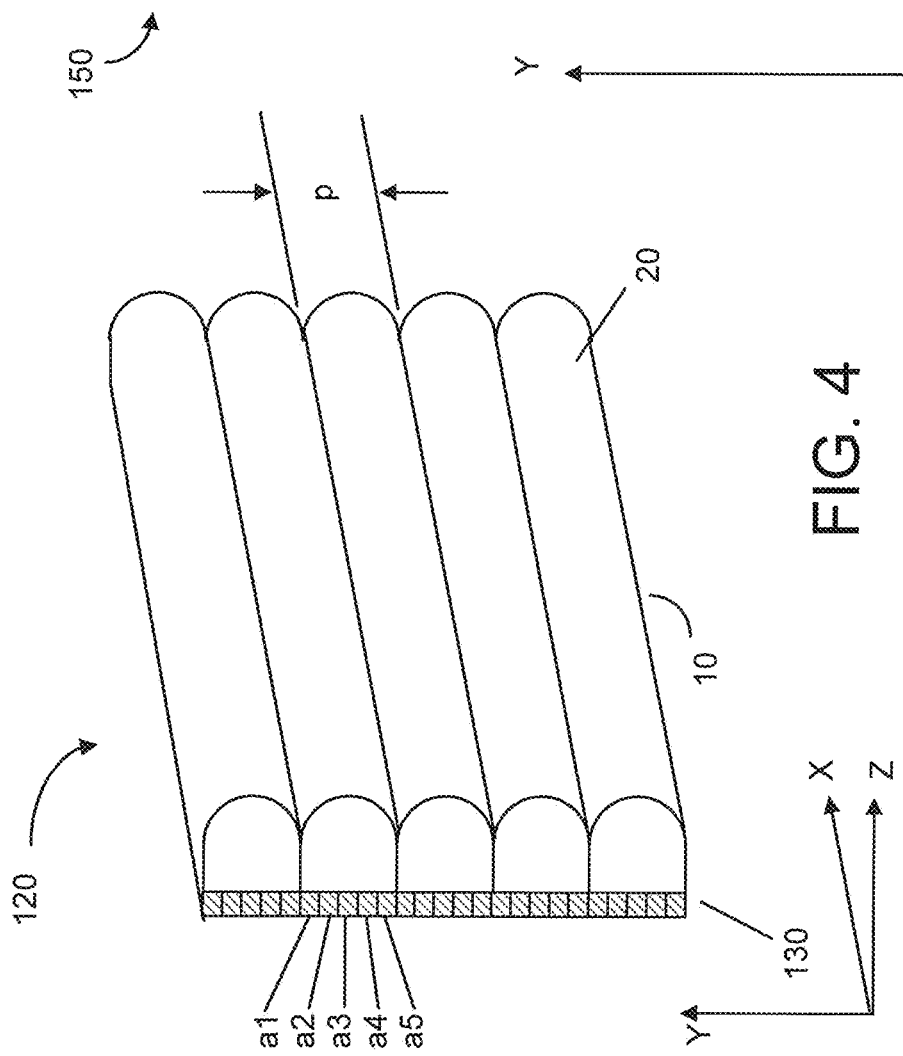
FIG. 4 shows a compressed print set up for viewing.
Figure 12A:
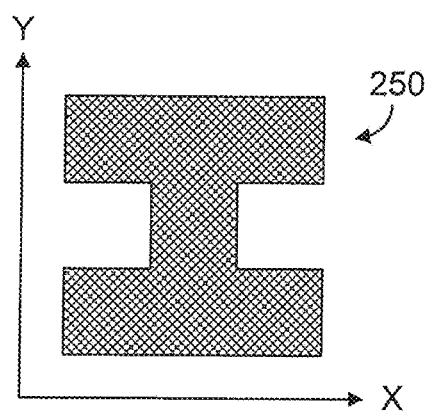
FIG. 12A shows another master image to be printed.

The parallax barrier can be a lenticular sheet 10, having a plurality of lenticules 20 as shown in FIGS. 3 and 4. The pitch, p, of a lenticular sheet is the width of the lenticule. The image to be compressed can be a symbol, a single or a group of alphabetic letters or a word. For example, the symbol to be compressed is the acronym "USA" as shown in FIG. 5, or an "I" or a rotated "H" as shown in FIG. 12A. It would be necessary, in some cases, to flip the symbol before the symbol is compressed and printed. The image or symbol to be compressed and printed is herein referred to as a master image. This master image will be "printed" on the base of the lenticular sheet 10 as a plurality of compressed images either photographically, or lithographically, or by any image forming method. By means of photographic printing, the bottom of the lenticular sheet has an image forming medium, such as a photo-sensitive layer similar to that of a photographic paper. Through the lenticules, the projected image of master image will be compressed and photographically printed on the photo-sensitive layer. After developing with photographic chemicals, the latent images on the photo-sensitive layer will become "printed" image. The photographic process of developing is not part of the invention. By means of lithographic printing, the compressed images are printed by a regular printer, such as an inkjet printer, a laser printer or the like, on a sheet of paper, for example. The paper having the printed compressed images will be attached to a lenticular sheet or a different type of parallax barrier. Again, how an image is printed on a sheet of paper is not part of the invention. The invention is concerned with how the master image is compressed in a printing process.

FIG. 3 is a schematic representation of a method of compressing a master image of a symbol onto a print material having a lenticular sheet 10 on top of an image forming medium. The master image can be divided into n parts (n is a positive integer equal to or greater than 2) so that the n parts are optically compressed into each of the lenticules 20. As shown in FIG. 3, the master image 180 is divided into five image portions A1, A2, A3, A4 and A5. Through the projection optics 140, the image portions A1-A5 are compressed to form a plurality of compressed images 130. Depending on the projection optics 140 and how the image portions are projected, the compressed images 130 may cover a plurality of lenticules 20. As shown in FIG. 3, the compressed images 130 under each lenticule 20 has five compressed images components a1, a2, a3, a4 and a5 in each of the lenticules 20, with a1 corresponding to A1, a2 corresponding to A2, etc. As such, in a number of lenticules 20 in the compressed print 120, the compressed images 130 are repeated. Each group of compressed images 130 under each lenticule is a compressed symbol 200. If the compressed symbol 200 is used as an identification tag that is not easily discernible by naked eyes, the compressed symbol 200 should be made very small. Thus, the lenticular sheet 10 is designed with lenticules 20 having very a small width, or pitch p (see FIG. 4). For example, p can be 0.1-0.5 millimeter, or 2-10 lenticules per millimeter. After the compressed images 130 are formed and processed, the compressed print 120 can be, for example, viewed through a viewing device in an orientation as shown in FIG. 4.

Figure 6B:
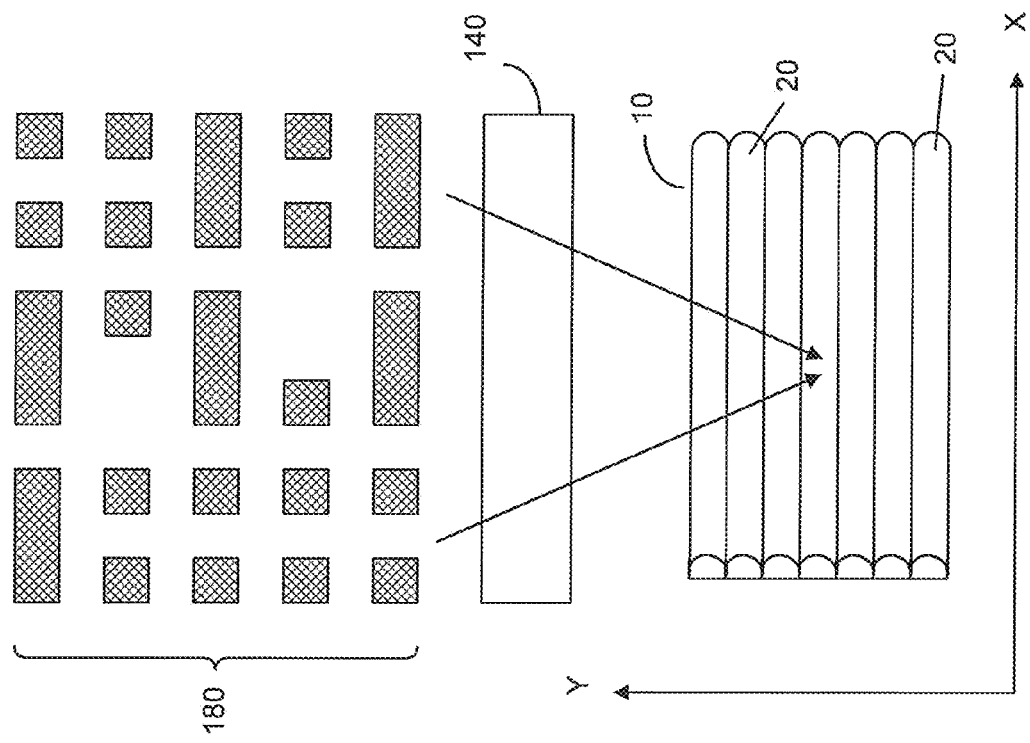
FIG. 6B shows a master image being divided and separated.
Figure 6A:
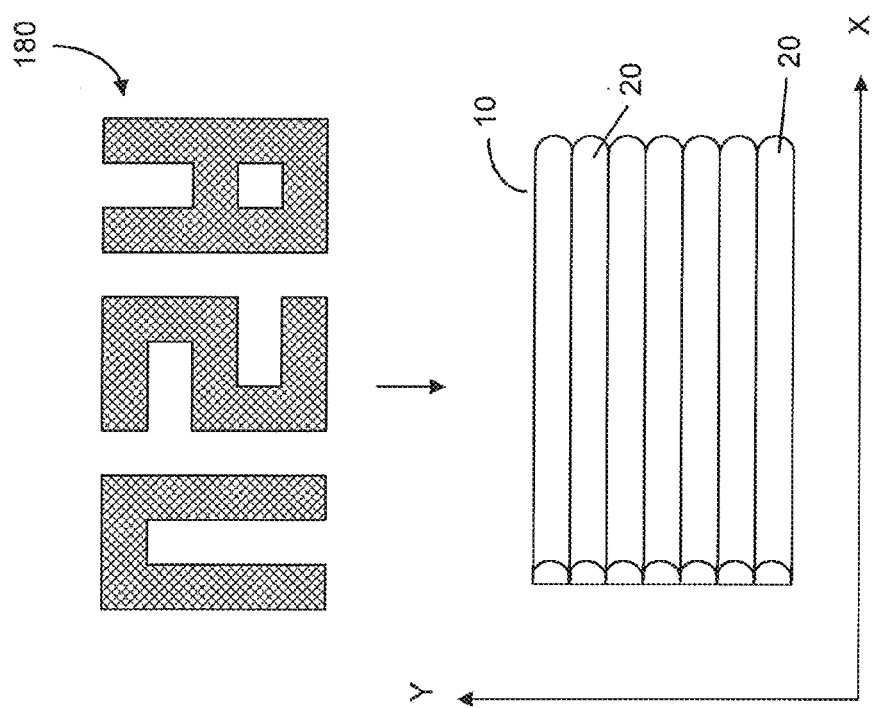
FIG. 6A shows a master image.
Figure 7:
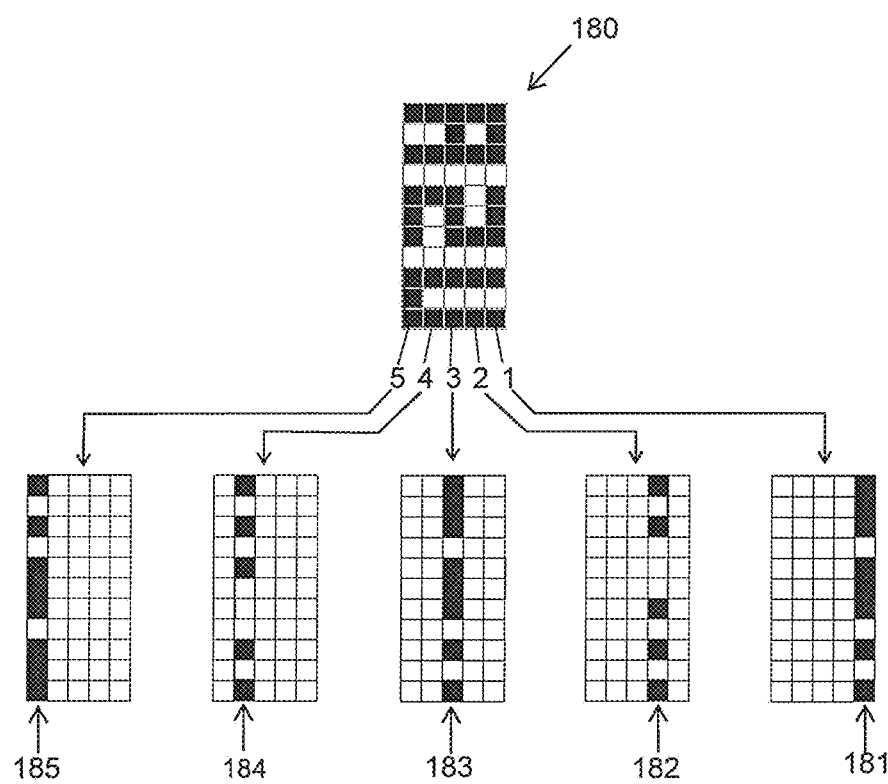
FIG. 7 shows how a master image is divided into partial images for printing.
Figure 8:
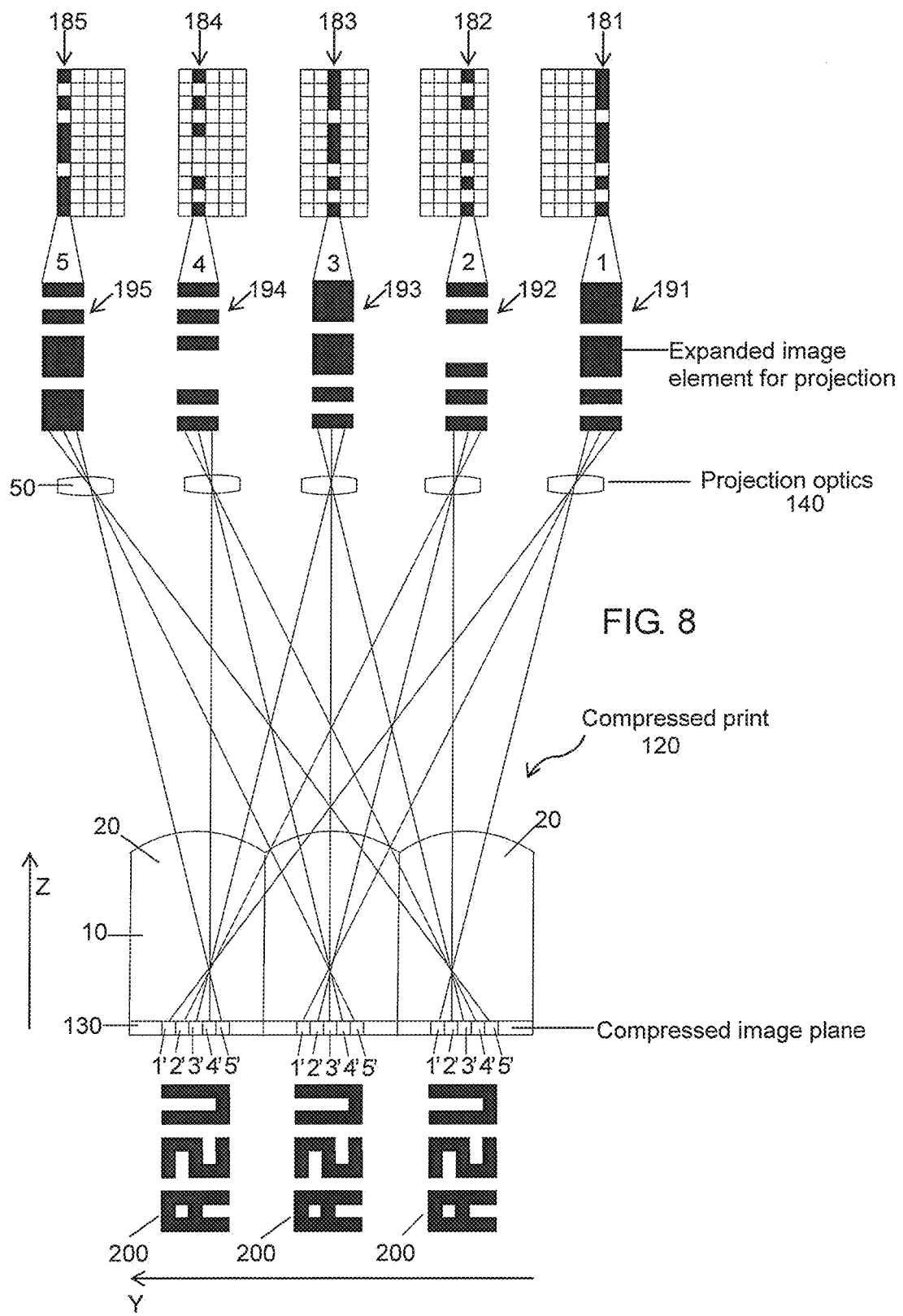
FIG. 8 shows the relationship between the partial images and the compressed symbols formed on the compressed image plane.
Figure 11:
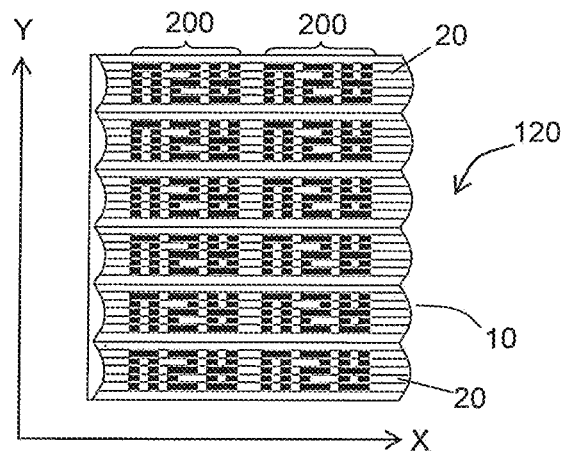
FIG. 11 is a schematic representation of a compressed print having two rows of compressed symbols made in a plurality of lenticules.
Figure 13:
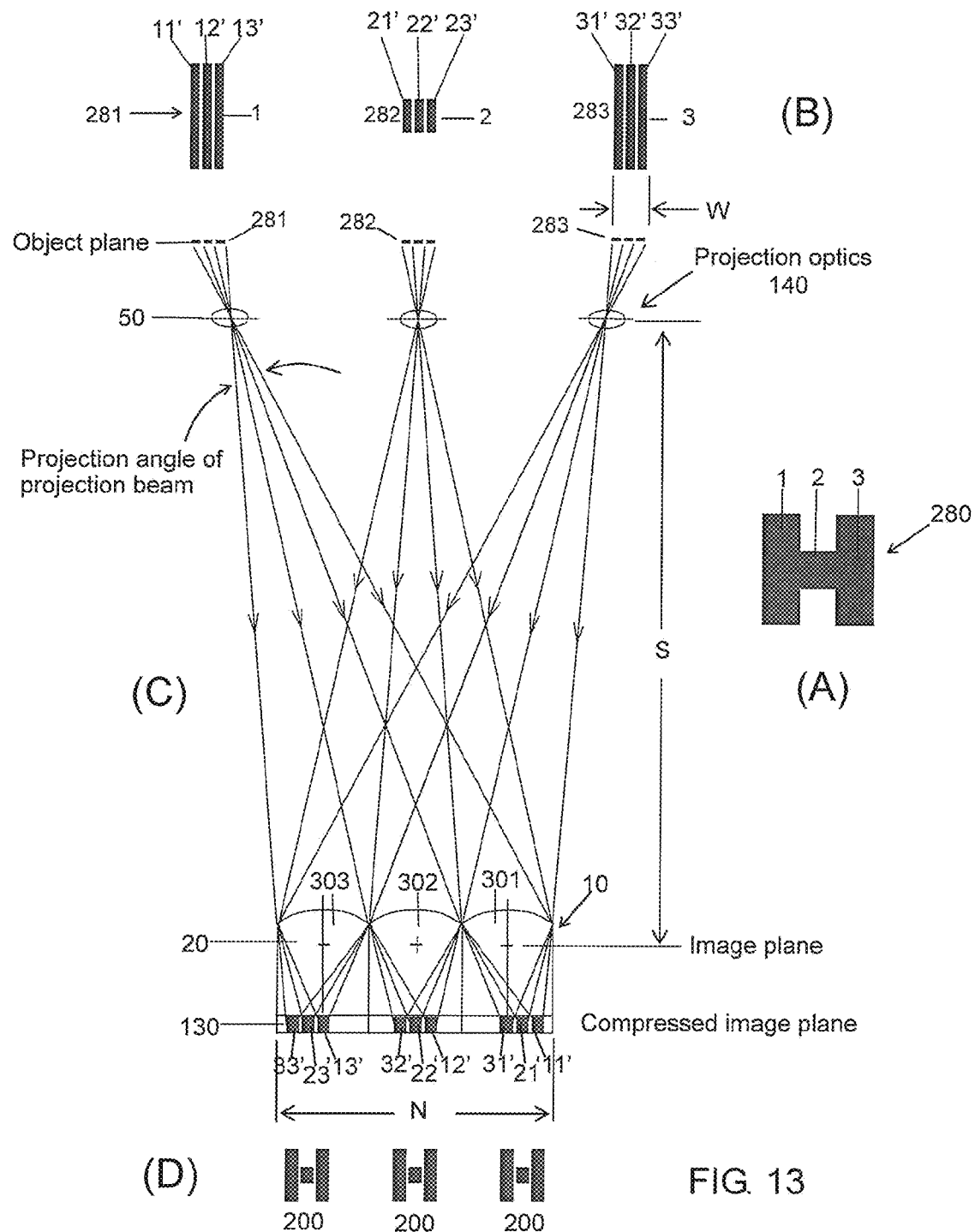
FIGS. 13A-13C shows the relationship between the partial images and the compressed images formed on the compressed image plane.
FIG. 13D shows a plurality of compressed symbols formed from the compressed images.

FIG. 5 is a schematic representation showing the symbol 150 of three alphabetical letters "USA" to be compressed to form two compressed symbols 200 in each lenticule 20 along the X direction (see FIG. 11). As shown in FIG. 11, the compressed symbols 200 of the symbol "USA" are formed repeatedly on the base of six lenticules 20 along the Y direction, with each lenticule 20 having two compressed symbols 200. Before the symbol 150 is compressed to form a compressed symbol 200 in the lenticules 20, it is flipped about the X direction to become a master image 180, as shown in FIG. 6A. The master image 180 is divided and separated into a plurality of partial images along the Y direction as shown in FIG. 6B. For illustration purposes, the master image 180 is divided into five image portions 1, 2, 3, 4 and 5. The five image portions are represented by five partial images 181, 182, 183, 184 and 185 as shown in FIG. 7. Before printing (optically projecting, for example), each of the partial images 181, 182, 183, 184 and 185 are horizontally expanded (along the Y axis) to become expanded image elements 191, 192, 193, 194 and 195. The expanded image elements 191-195 are projected through one or more projection lenses 50 in the projection optics 140, each at a different projection angle as shown in FIG. 8. It should be noted that, the partial images 181-185 are expanded so that the compressed images 130 are formed in a greater number of lenticules 20. If the partial images 181-185 are sufficiently wide and only a small number of compressed images 130 to be formed in the lenticules 20 is desired, it may not be necessary to expand the partial images into expanded image elements (see FIG. 13). As shown in FIG. 8, each group of the compressed images 130 on the compressed image plane is a compressed symbol 200. The same compressed symbols are also shown in FIG. 11.

Figure 9:
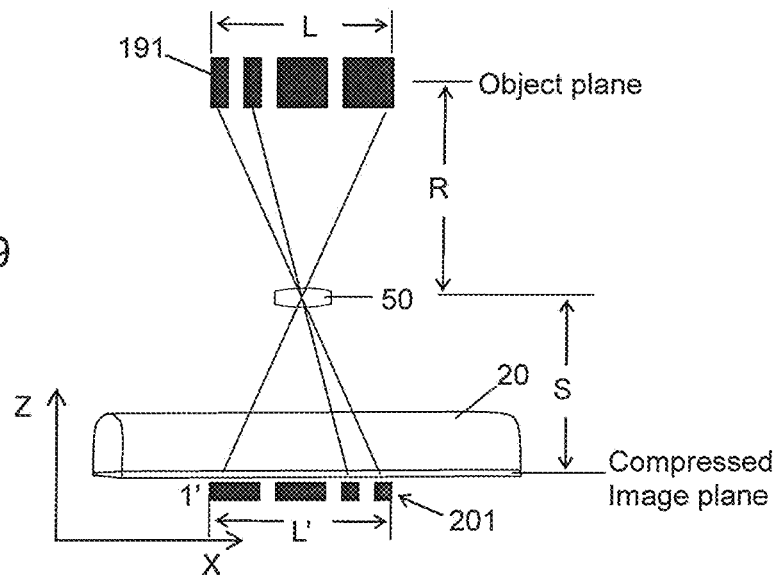
FIG. 9 shows the projection of an expanded partial image onto the compressed image plane along the longitudinal axis of a lenticule.

It should be noted that, the projected image of each of the expanded image elements 191-195 along the longitudinal axis (X direction in FIG. 9) of the lenticules 20 is not substantially affected by the surface curvature of the lenticules 20. As shown in FIG. 9, the length L' of the projected image (printed image element) 201 is determined by the distance R between the projection lens 50 and the object plane, the distance S between the projection lens 50 and the compressed image plane, and the length L of the expanded image element 191. In contrast, the other dimension of the "printed" image elements is also determined by the pitch of the lenticules 20 (see FIGS. 8 and 13, for example).

Figure 10:
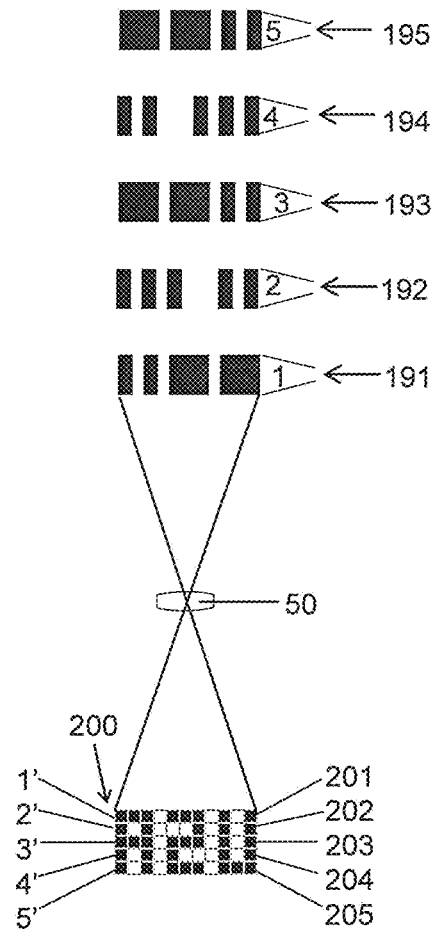
FIG. 10 shows the relationship between a compressed symbol formed on the compressed image plane and the expanded partial images.

FIG. 9 only shows the printed image element 201 (corresponding to expanded image element 191) formed at location 1' under each lenticule 20 (see FIG. 8). It is understood that the printed image elements 202, 203, 204, 205, corresponding to expanded image elements 192, 193, 194, 195) are formed at locations 2', 3', 4', 5' (see FIG. 8). Thus, in each lenticule 20, a compressed image composed of printed image element 201-205 is a compressed symbol 200 as shown in FIGS. 8 and 10. In FIG. 11, the same compressed symbol 200 is shown to be formed under six lenticules 20, but the number of lenticules 20 that has the same compressed symbols 200 in a compressed print 120 can be smaller or greater than six. The number of compressed symbols 200 may vary, depending on the size of the expanded image elements, the projection angle of the projection lenses 50 and the pitch of the lenticules 20. For example, if the projection angle of the projection lens 50 covers 10 mm of the image plane and the width or pitch of the lenticules 20 is 0.5 mm, then the number of repeated compressed symbols 200 is about twenty. Furthermore, in the same lenticule 20, one, two or many compressed symbols 200 can be printed.

Figure 12B:
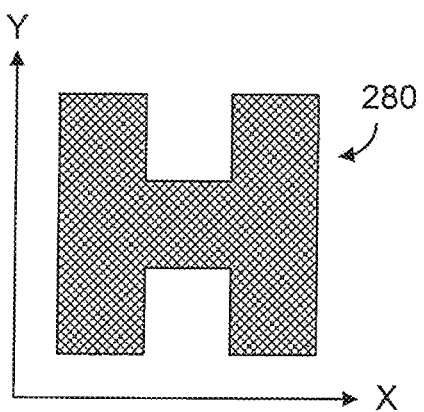
FIG. 12B shows the rotated master image.

It should be noted that, it may not be necessary to expand the partial images along the Y direction if the partial images are sufficiently wide to be projected into the desirable number of lenticules 20. For example, letter "I" as shown in FIG. 12A can be divided into three partial images that are sufficiently wide to be compressed into a number of lenticules. This letter "I" is similar to the letter "H" in a different orientation as shown in FIG. 12B. Unlike the symbol 150 as shown in FIG. 5, which requires a flipping about the X direction to become a master image 180 as shown in FIG. 6A, the symbol 250 as shown in FIG. 12A does not require a flipping about the X direction to become a master image 280 as shown in FIG. 12B.

As shown in FIG. 13A, the master image 280 can be divided into three image parts 1, 2, 3. As images parts 1, 2, 3 are separated and placed on the object plane for printing, they are shown as partial images 281, 282 and 283 in FIG. 13B. The width W of the partial images 281, 282 and 283 gives rise to the projection angle of a projection beam. The projection angle, together with the distance S from the projection lenses 50 to the image plane, determines the number N of lenticules 20 in which the compressed images 130 are formed. For illustration purposes only, the number of lenticules 20 in which the compressed images 130 are formed is three, and those lenticules 20 are labeled as 301, 302 and 303 as shown in FIG. 13C. Since only three groups of compressed images are formed under the lenticular sheet 10, each of the partial images 281, 282, 283 is effectively divided into three image strips as shown in FIG. 13B. As can be seen in FIG. 13C, as the partial images are projected on the lenticular sheet 10, the image strips 11, 21, 31 form compressed image parts 11', 21' 31' of the compressed image 130 in lenticule 301, the image strips 12, 22, 32 form compressed image parts 12', 22', 32' of the compressed image 130 in lenticule 302, and the image parts 13, 23, 33 form compressed image parts 13, 23, 33 of compressed image 130 in lenticule 303. Each of the compressed images 130 formed at the base of each lenticule 20 is a compressed symbol 200 as shown in FIG. 13D.

It should be noted that the gaps between two adjacent image strips in each of the partial images 281, 282 and 283 are for illustration purposes only. The gaps are not necessary and can be eliminated entirely. Furthermore, depending on the width of the partial images 281, 282, 283 (FIG. 13B) or the expanded image elements 191-195 (FIG. 8), the number of lenticules 20 under which the compressed symbol 200 is formed can be more than three as shown in FIG. 15B.

Figure 14A:
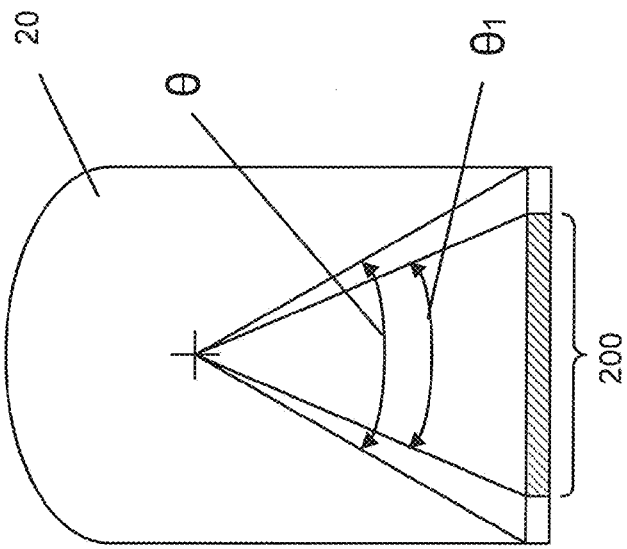
FIG. 14A shows the lenticular angle and the viewing angle of a compressed symbol.

In general, to see a complete image of the compressed symbol 200, the viewing angle of a viewing apparatus must be substantially equal to the lenticular angle θ of the lenticule 20 as shown in FIG. 14A. If the compressed symbol 200 has a subtended angle $\theta_1$ smaller than the lenticule angle θ, it is necessary to have a viewing angle substantially equal to $\theta_1$ in order to see the entire image of the compressed symbol 200. For example, if the lenticular angle is 30 degrees, it requires a viewing angle of about 30 degrees to see the entire image in each lenticule 20. If the printed area of the compressed images containing a number of compressed symbols is 20 mm and a viewer looks at the compressed print 120 from a distance of 300 mm as shown in FIG. 14B, the viewing angle is about 3.8 degrees. When comparing the viewing angle of 3.8 degrees to the lenticular angle θ of 30 degrees, the viewer can only see about 13 percent of each of the compressed symbols. Thus, unless the viewer views the compressed print at a very close distance, say, 40 mm, the compressed symbol cannot be identified. For that reason, the compressed symbols are indiscernible by the naked eyes and the compressed symbol can be used as a hidden identification tag.

Figure 15A:
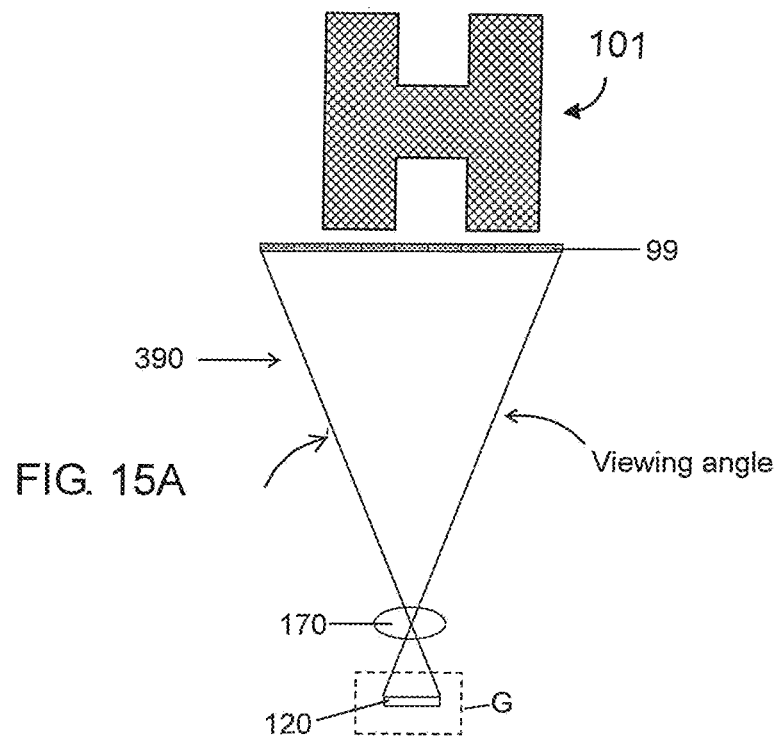
FIGS. 15A and 15B how the compressed symbols in a compressed print is viewed using a viewing apparatus.
Figure 15B:
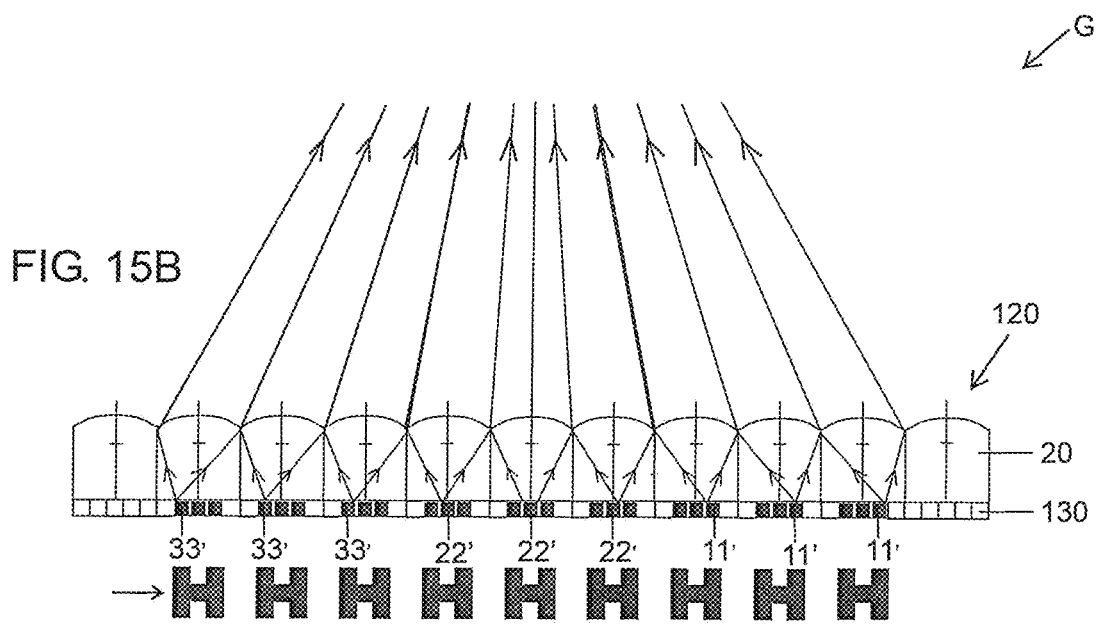

In order to see the hidden identification tag, a viewing apparatus 390 can be used as shown in FIGS. 15A and 15B. The viewing apparatus 390 may have a viewing lens 170 placed close enough to the compressed print 120 so that the viewing angle is comparable with the lenticular angle θ (see FIG. 14A). A projection screen or a display 99 or the like can be used to show the reassembled or reconstructed image 101 of the compressed symbol on the compressed print 120 as shown in FIG. 15A. FIG. 15B shows an enlarged representation of the section G as shown in FIG. 15A. In a different embodiment of the present invention, the viewing apparatus is a digital device in which an optoelectronic sensor, such as the optical sensor array in a digital camera, is used to sense the reconstructed image 101, in lieu of the projection screen/display 99. A cell-phone camera may be used as a viewing apparatus, for example.

The compressed symbol 200 in a compressed print 120, as shown in FIGS. 11 and 15B, can be used for security authentication purposes, for example. The compressed print 120 can be a part of a security tag (not shown). As shown in FIG. 15B, the compressed image 200 contains three image elements, but the number of lenticules 20 under which the compressed symbol 200 is formed is nine and those lenticules are labeled as 301-309. For simplicity, the three image elements in each of compressed image 200 under a lenticule 20 are labeled as 11', 22' and 33' as shown in FIG. 15C. In order to see a compressed image 200 having three different image elements, the viewing angle (see FIG. 14A) must cover at least three lenticles 20. FIG. 15C shows a minimum viewing distance for setting up a viewing apparatus 390 for viewing a complete compressed symbol 200. The reconstructed image of the symbol 210 on the screen or display 99 has three image segments 91, 92 and 93, corresponding to the image elements 11', 22' and 33'.

Figure 16:
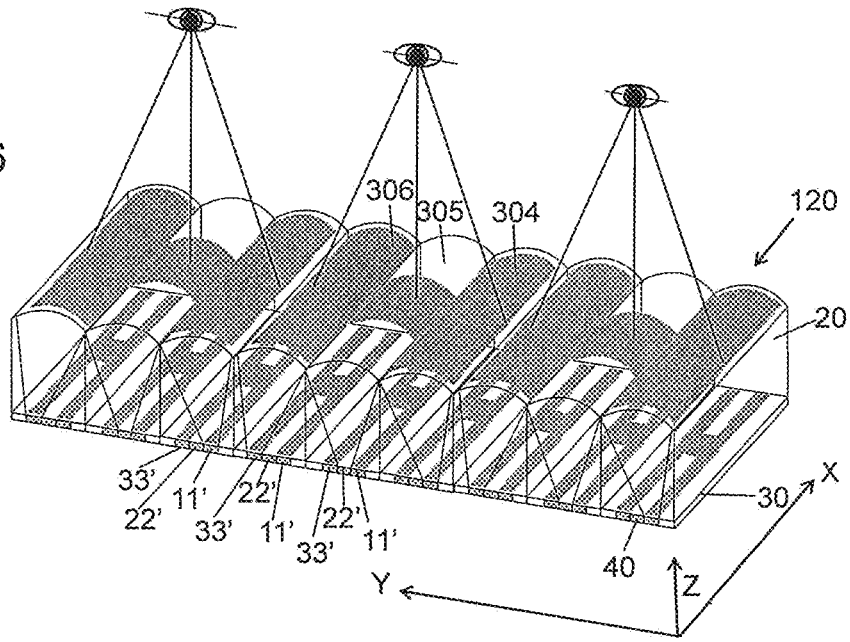
FIG. 16 is a schematic representation of an enlarged image of the compressed symbol when viewed at a close distance.

For illustrating purposes, the number, M, of the image elements under each lenticule 20 is three (or M=3). Given a viewing angle, the minimum viewing distance is such that each image segment in the reconstruct image 210 is indicative of a different one of the M image elements in M consecutive lenticules 20 as shown in FIG. 15C. However, when the compressed print 120 is viewed at a greater distance and the viewing angle covers more than three lenticules 20 as shown in FIG. 15B, then the reconstructed image 101 (FIG. 15A) is assembled from the image elements 11' under the lenticules 301-303, the image elements 22' under the lenticules 304-306, and the image elements 33' under the lenticules 307-309. In general, the width or pitch of the lenticules 20 is very small, or 0.05-0.5 millimeter, for example. With a viewing angle of 30 degrees and M=3, the viewing distance is about 0.28-2.8 millimeters. In practice, it would be desirable to form the compressed symbol under a larger number N of the consecutive lenticules. For example, N=9 and the viewing distance is arranged such that each image segment in the reconstruct image 210 is indicative of a different one of the M image element in N consecutive lenticules 20 as shown in FIG. 15B. In that case, the viewing distance can be three times greater, or 0.8-8.4 millimeters. When N increases, the viewing distance will also increase, but the compressed symbol can be seen if the viewing angle is greater or substantially equal to the subtended angle as shown in FIG. 10A. A cell-phone or a camera with a close-up lens may be used as a viewing apparatus for viewing the compressed image. FIG. 16 is a schematic representation showing how the compressed symbol of FIG. 13D looks like when viewing at a close range. Similar to FIG. 15C, only the M image elements under M lenticules are reassembled to become a reconstructed image.

Figure 18:
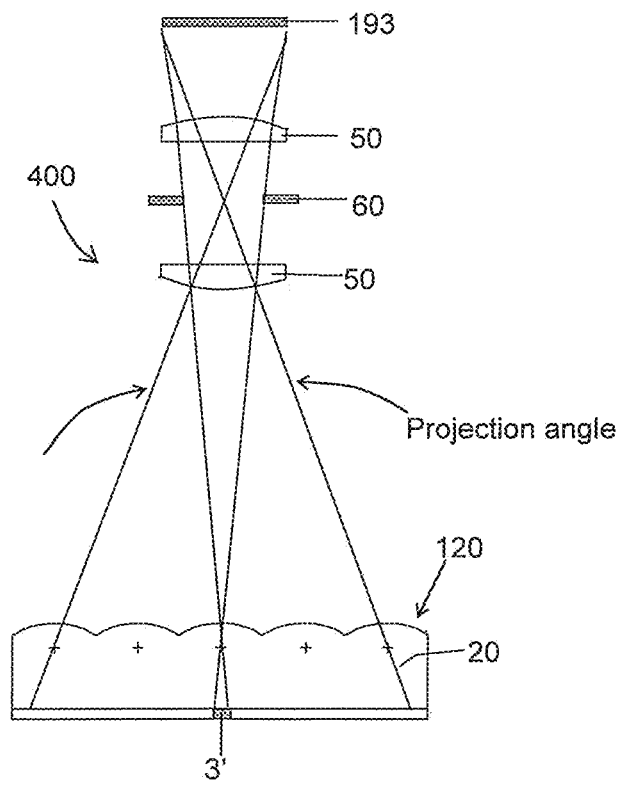
FIG. 18 shows how the width of a compressed image element is controlled, according to one embodiment of the present invention.
Figure 17:
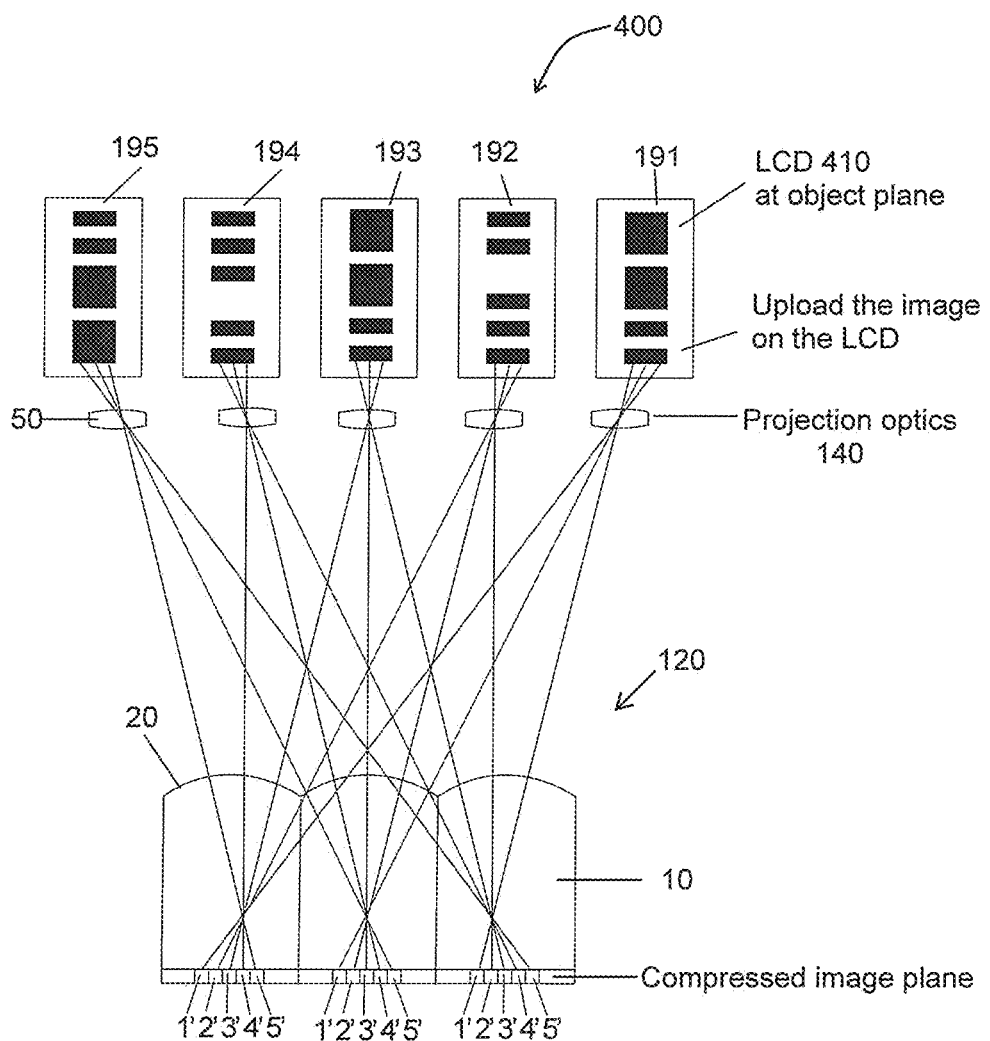
FIG. 17 shows a printing apparatus for making a compressed print, according to one embodiment of the present invention.

FIG. 17 is a schematic representation of a printing apparatus 400, according to one embodiment of the present invention. The printing apparatus 400 has one or more image display device 410 to display the expanded partial images 191-195 (see FIG. 8) at the object plane of the projection lens or lenses 50 for projection. The display device 410 can be a liquid crystal display (LCD), for example. Other display device, such as an OLED display, or an image projector having a screen at the object plane can also be used. As shown in FIG. 18, the width of the printed image element at location 3' corresponding to the expanded partial image 193 (see FIGS. 8 and 10) can be controlled using an aperture 60 in relationship to the projection lenses 50.

Figure 19A:
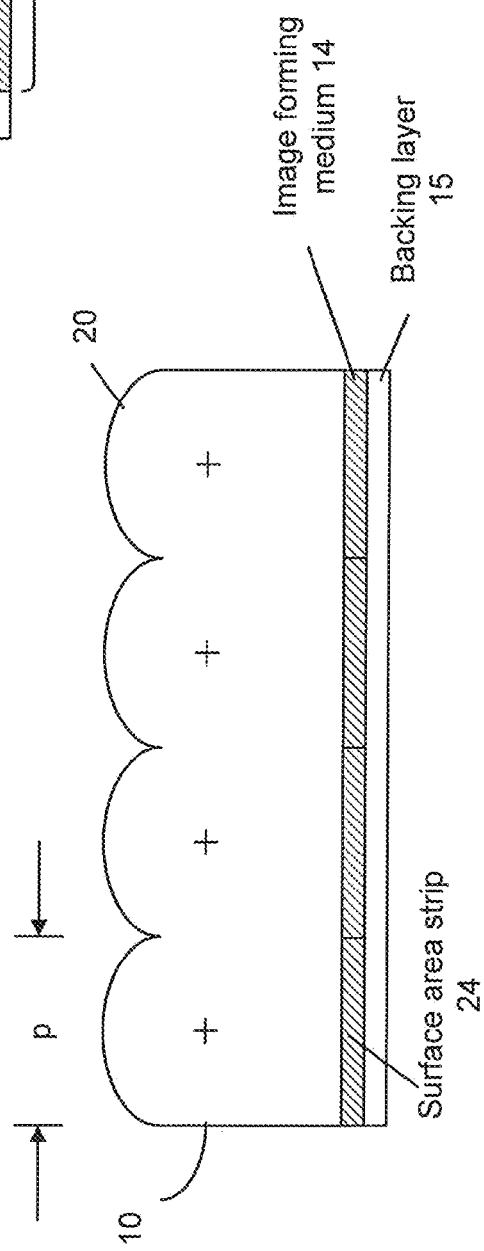
FIG. 19A shows a lenticular sheet with an image forming medium and a backing layer.
Figure 19B:
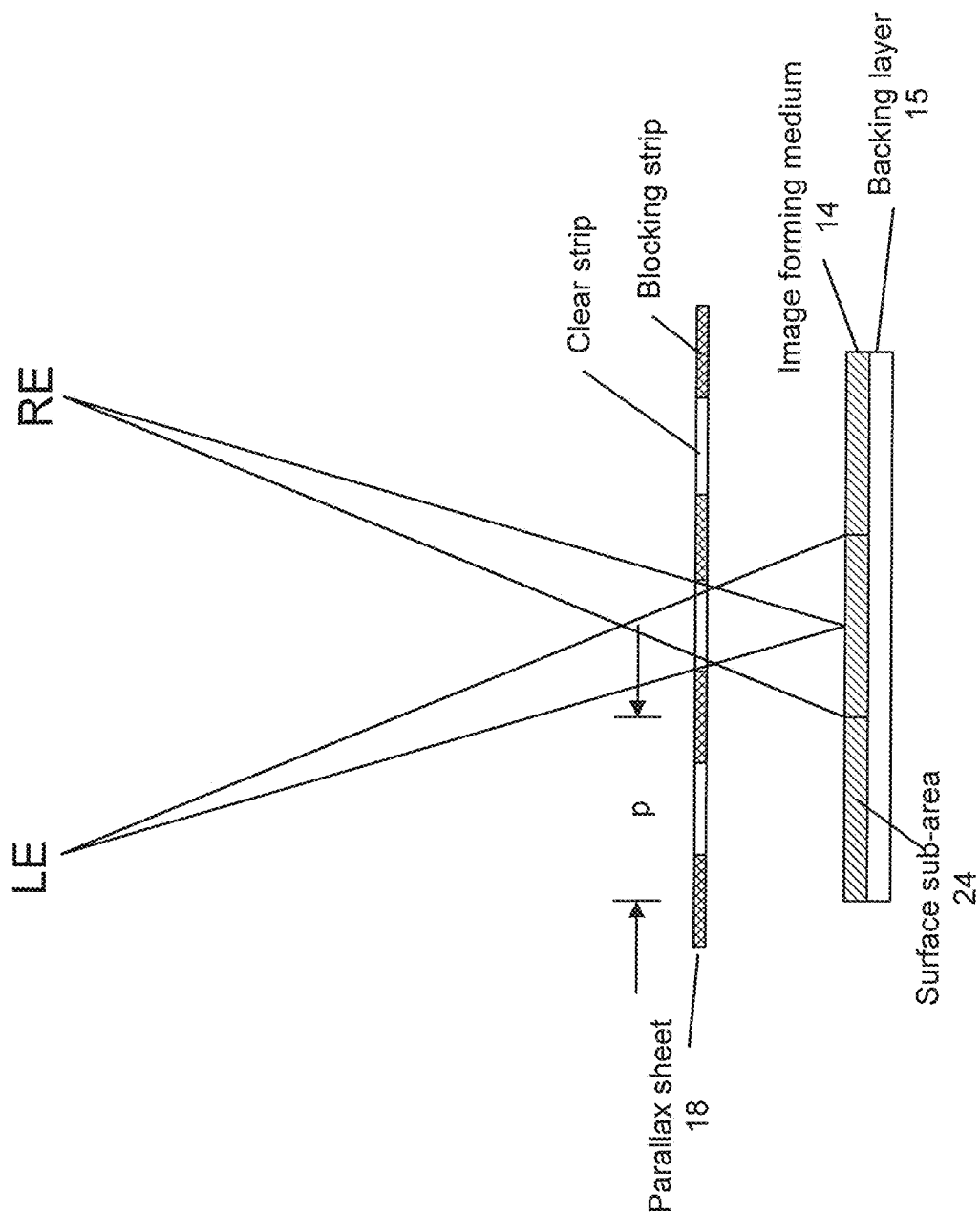
FIG. 19B shows a parallax sheet for used as a parallax barrier.

It should be noted that, the hidden identification tag, according to different embodiments of the present invention, can be made on a print material with different types of parallax barriers. The parallax barrier can be a lenticular sheet 10 as shown in FIGS. 3 and 19A, for example. As shown in FIG. 19A, compressed images are formed or printed on an image forming medium 14 located between the lenticular sheet 10 and a backing layer 15. The image forming medium 14 comprises a plurality of surface area strips 24, each surface area strip 24 substantially equal to or slightly larger than the base of a lenticule 20. One or more compressed symbol 200 (see FIGS. 10 and 11, for example) may be formed or printed within the surface area strip 24. A lenticule 20 in a lenticular sheet 10 is a parallax strip of a parallax barrier. The parallax barrier can also be a parallax sheet 18 placed on top of an image forming medium 14 as shown in FIG. 19B. The parallax sheet 18 has a plurality of clear strips and light blocking strips alternately arranged. The surface area strip 24 is defined as an area of the image forming medium 14 under the pitch, p, of the parallax sheet 18. A section of the parallax sheet 18 defined by the pitch p is considered as a parallax strip of a parallax barrier.

Figure 20A:
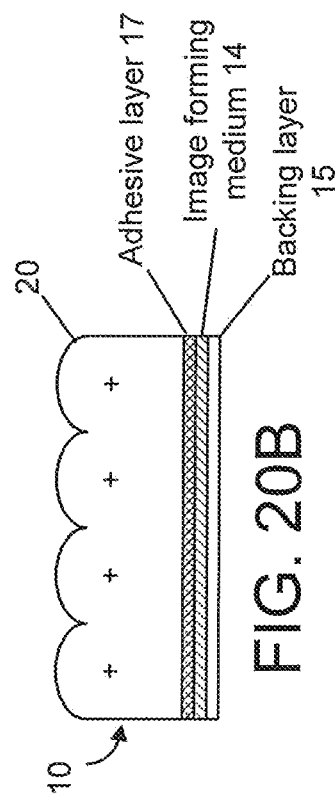
FIGS. 20A-20C shows different lenticular print materials for use in making the compressed print, according to various embodiments of the present invention.
Figure 20B:
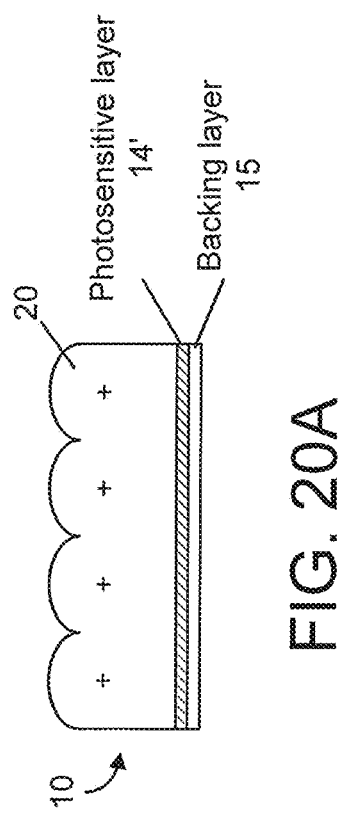

The image forming medium can be a photo sensitive layer as shown in FIG. 20A or a print material 19 as shown in FIG. 20B. In the embodiment as shown in FIG. 20A, the photosensitive layer, or photographic emulsion 14' can be directly coated or laminated on the back of a lenticular sheet 10, and a backing layer 15 is then coated or laminated on the photo sensitive layer 14'. As such, the partial images or expanded partial images (see FIGS. 8 and 10) can be projected through the lenticules 20 onto the photographic layer 14' to form latent images. The backing layer 15 can be made of a porous material so as to allow photographic chemical to pass through the backing layer 15 and chemically treat the photographic layer in order to turn latent images into visible images.

Figure 20C:
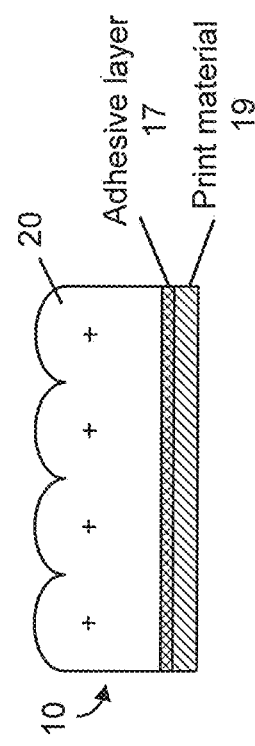

In the embodiment as shown in FIG. 20B, the image forming medium 14 and the backing layer 15 are laminated on the back of a lenticular sheet 10 with an adhesive layer 17, for example. In the embodiment as shown in FIG. 20C, the print material 19 can be a sheet of photographic paper to be laminated onto the back of the lenticular sheet 10 using an adhesive layer 17. As with the embodiment as shown in FIG. 20A, the partial images or expanded partial images can be projected through the lenticules 20 and the adhesive layer 17 onto the photographic material 19. Alternatively, compressed images 130 can be printed on a substrate, such as a piece of paper, a plastic sheet, or any suitable flat surface, by a printer, such as photographic printer, laser printer or inkjet printer, to become a printed substrate 110 as shown in FIG. 20D. The printed substrate is then laminated to the back of a lenticular sheet to become a compressed print 120. The substrate can be the image forming medium 14, together with the backing layer 15 as shown in FIG. 20B. The substrate can be the print material 19 as shown in FIG. 20C. The lenticular sheet 10 as shown in FIGS. 20A-20C is a type of parallax barrier having a plurality of barrier strips, and each of the lenticules 20 is equivalent to a barrier strip on a parallax barrier.

In summary, the present invention is concerned with providing miniaturized images under a parallax barrier comprising a plurality of barrier strips. In particular, the image of a symbol can be compressed to fit within barrier strip of the parallax barrier and the same image may be printed or formed under a plurality of adjacent barrier strips. In order to hide the image from viewing, the pitch of the parallax barrier or the width of a barrier strip is chosen such that the compressed image is indiscernible by naked eyes. To see the hidden image, one must use a viewer with a viewing lens setup at a certain distance on top of the parallax barrier. The reasons why the compressed images under the lenticules appear to be hidden are as follows:

a) the pitch of the lenticules and thus the size of the compressed images;

b) the viewing distance; and c) the repetition of compressed images over a large number of lenticules makes the compressed images appear to be straight strips (see FIG. 11).

It should be noted that each of the compressed print can be individually produced by an optical printing device 400 such as that shown in FIG. 17 on a print material such as one shown in 20A. In one of the embodiment of the present invention, the imaging forming medium 14 and the backing layer 15 are separable from the lenticular sheet 10. The compressed images on the image forming medium 14, such as that shown in FIG. 20D can be copied to become a master artwork. This master artwork can be reproduced by a laser printer or other kinds of printer on regular paper or substrate. This substrate can then be laminated to the back side of a lenticular sheet 10 by an adhesive layer to become a compressed print, similar to that depicted in FIG. 20B or 20C.

In yet another embodiment of the present invention, the partial images 181-185 (see FIG. 8) are digitally rearranged and compressed so that all of the partial images 181-185 become a compressed symbol 200 that can be fitted within the base of a lenticule. The compressed symbol 200 that is digitally formed can be copied and arranged so that a plurality of compressed symbols 200 can be optically or lithographically printed on a substrate without a lenticular sheet 10 (see FIG. 20D, for example). This substrate can then be laminated to the back side of a lenticular sheet 10 by an adhesive layer to become a compressed print, similar to that depicted in FIG. 20B or 20C. The surface of the substrate can be considered as an image forming surface, equivalent to the surface of the image forming medium as shown in FIG. 20B, for example.

Figure 21:
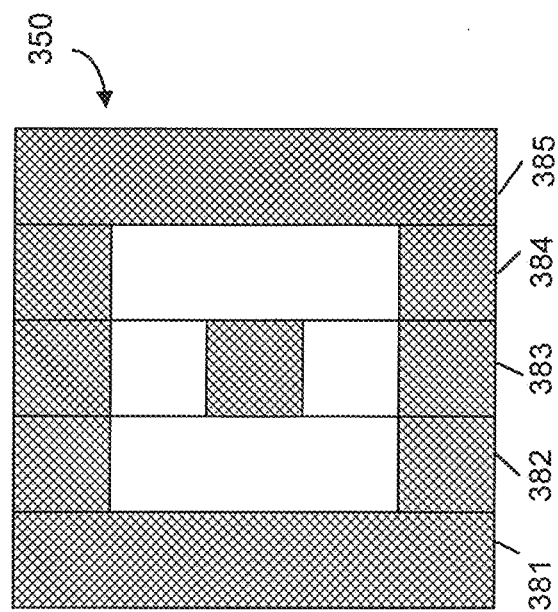
FIG. 21 shows a symbol which may be used as a master image.

In various embodiments of the present invention, it is understood that the image compressing is carried out partly by a parallax barrier having a plurality of barrier strips, each barrier strip having a longitudinal axis parallel to X axis. In the embodiment as shown in FIGS. 5-10, the image compressing or printing process comprises the following steps: 1) a symbol 150 is flipped about the X axis to become a master image 180; 2) the master image 180 is divided into a plurality of partial images 181-185 along Y axis; 3) the partial images 181-185 are separately expanded along Y axis to become expanded partial images 191-195; and 4) the expanded partial images 191-195 are presented on an object plane of projection optics 140 so that the expanded image elements 191-195 are optically compressed to form compressed symbols 200 on an image forming medium (see FIGS. 19A-20C). In the embodiment as shown in FIGS. 12A-13D, the image compressing or printing process comprises the following steps: 1) a symbol 250 is used as a master image 280; 2) the master image 280 is divided into a plurality of partial images 281-283 along Y axis; and 3) the partial images 281-283 are presented on an object plane of projection optics 140 so that the partial images 281-283 are optically compressed to form compressed symbols 200 on an image forming medium. It is understood by a person of ordinary skilled in the art that a symbol like a square or a group of nested squares 350 as shown in FIG. 21 does not need to be flipped to become a master image or rotated before being divided into partial images. The symbol 350 can be divided into a plurality of partial images 351-358, which can be presented on the object plane of the projection optics for image compressing or printing.

Therefore, although the present invention has been described with respect to one or more embodiments thereof, it will be understood by those skilled in the art that the foregoing and various other changes, omissions and deviations in the form and detail thereof may be made without departing from the scope of this invention.

What is claimed is:

1. A method for producing a compressed image of a symbol on a print, the print comprising an image forming surface and a lenticular sheet disposed over the image forming surface, the lenticular sheet comprising a plurality of lenticules, each of the lenticules having a lenticular angle and a lenticular width, wherein the image forming surface comprises a plurality of surface area strips, each surface area strip located substantially under a lenticule and substantially equal to the lenticular width, said method comprising:
   dividing the symbol into a plurality of image portions; and
   forming a plurality of image elements in each of two or more surface area strips for producing the compressed image of the symbol in each of said two or more surface area strips, each image element corresponding to a different one of the image portions, such that only when a viewing apparatus is placed in proximity of the lenticular sheet over said two or more surface area strips and a viewing angle of the viewing apparatus is greater than or substantially equal to the lenticular angle, substantially an entirety of the compressed image of the symbol is revealed by the viewing apparatus for identifying the symbol.

2. The method according to claim 1, wherein each of the lenticules has a longitudinal axis parallel to a first direction, and said dividing is carried out such that each image portion is adjacent to at least another one of the image portions in a second direction substantially perpendicular to the first direction.

3. The method according to claim 2, wherein said forming comprises optically projecting each of the image portions through the lenticules at a different projection angle.

4. The method according to claim 3, wherein said optical projecting comprises:
   arranging the image portions on an object plane of a projection apparatus;
   locating each of the image portions at a different location along the second direction so as to achieve the different projection angle; and
   locating the image forming surface on an image plane of the project apparatus, the projection apparatus configured to project the image portions through the lenticules to form the corresponding image elements on the image forming surface.

5. The method according to claim 3, further comprising:
   broadening each of the image portions along to the second direction prior to said optically projecting, based on a number of said two or more area strips.

6. The method of claim 3, wherein the image forming surface comprises a photosensitive layer, and the image elements comprise latent images in the photosensitive layer, said method further comprising:
   chemically treating the photographic layer after said optically projecting for changing the latent images into visible image elements.

7. The method of claim 6, wherein the image forming surface is located between the lenticular sheet and a backing layer attached to the image forming surface and wherein said chemically treating is carried out through the backing layer.

8. The method according to claim 1, wherein each of the lenticules has a longitudinal axis parallel to a first direction, said method further comprising:
   flipping the symbol about a flipping axis before dividing the symbol into the plurality of image portions, the flipping axis substantially parallel to the first direction.

9. The method according to claim 1, wherein said forming comprises printing said plurality of image elements directly onto the image forming surface to provide a printed surface, said method further comprising:
   attaching the lenticular sheet onto the printed surface to provide the print.

10. A compressed print, comprising:
    an image forming surface; and
    a lenticular sheet disposed over the image forming surface, the lenticular sheet comprising a plurality of lenticules, each of the lenticules having a lenticular angle and a lenticular width, wherein the image forming surface comprises a plurality of surface area strips, each surface area strip located substantially under a lenticule and substantially equal to the lenticular width, wherein the image forming surface comprises at least one compressed image of a symbol in each of two or more surface area strips, the symbol comprising a plurality of image portions, wherein said at least one compressed image comprises a plurality of image elements formed in each of said two or more surface area strips, each image element corresponding to a different one of the image portions, such that only when a viewing apparatus is placed in proximity of the lenticular sheet over said two or more surface area strips and a viewing angle of the viewing apparatus is greater than or substantially equal to the lenticular angle, substantially an entirety of the compressed image of the symbol is revealed by the viewing apparatus for identifying the symbol.

11. The compressed print according to claim 10, wherein each of the lenticules has a longitudinal axis parallel to a first direction, and the symbol is divided into the plurality of image portions along a second direction substantially perpendicular to the first direction such that each image portion is adjacent to at least another one of the image portions in the second direction.

12. The compressed print according to claim 10, wherein said a least one compressed image is photographically formed on the image forming surface, the image forming surface comprising a photosensitive layer and the image elements are photographically formed in the photosensitive layer.

13. The compressed print according to claim 12, further comprising a backing layer attached to the image forming surface, such that the image forming surface is located between the lenticular sheet and the backing layer.

14. The compressed print according to claim 13, wherein the backing layer comprises a porous surface configured to allow photographic chemical to pass through the backing layer to treat the photosensitive layer for forming the image elements.

15. The compressed print according to claim 14, wherein the image elements formed in the photosensitive layer comprises latent images, and wherein the photographic chemical configured to turn the latent images in the photosensitive layer into visible image elements.

16. The compressed print according claim 10, wherein said plurality of image elements are directly printed on the image forming surface to provide a printed surface, and the lenticular sheet are attached onto the printed surface.

17. A security identification system, comprising
a viewing apparatus configured to authenticate a security tag, the security tag comprising at least one compressed print according to claim 10, wherein said two or more surface area strips comprises N surface area strips and said plurality of image elements comprise M image elements, wherein N and M are positive integers greater than two and N is equal to or greater than M, and wherein the viewing apparatus comprises viewing optics arranged at a view distance over the security tag for forming a reconstructed image indicative of the symbol, the viewing distance is arranged such that the reconstructed image comprises a plurality of image segments, each image segment indicative of a different one of said M image elements from a different one of the N surface area strips.

18. A method of viewing a symbol in a compressed print, comprising:
arranging a viewing apparatus over the compressed print at a viewing distance; and
forming a compressed image of the symbol, the compressed print comprising:
an image forming surface; and
a lenticular sheet disposed over the image forming surface, the lenticular sheet comprising a plurality of lenticules, each of the lenticules having a lenticular angle and a lenticular width, wherein the image forming surface comprises a plurality of surface area strips, each surface area strip located substantially under a lenticule and substantially equal to the lenticular width, wherein the image forming surface comprises the compressed image of the symbol in each of N surface area strips, the symbol comprising M image elements, wherein N and M are positive integers greater than 2, and N is equal to or greater than M, wherein the compressed image of the symbol comprises a plurality of image segments, each image segment indicative of a different one of said M image elements, and wherein the viewing distance is arranged such that a viewing angle of the viewing apparatus is greater than or substantially equal to the lenticular angle so that an entirety of the compressed image of the symbol is revealed by the viewing apparatus for identifying the symbol from the N surface area strips.

19. The method according to claim 18, wherein the viewing apparatus comprises a camera having a display for viewing the image of the symbol.

20. The method according to claim 18, wherein the viewing apparatus comprises a viewing lens and an image forming medium for forming the image of the symbol.

* * * * *